US008761254B2

(12) United States Patent
Boon et al.

(10) Patent No.: US 8,761,254 B2
(45) Date of Patent: Jun. 24, 2014

(54) IMAGE PREDICTION ENCODING DEVICE, IMAGE PREDICTION DECODING DEVICE, IMAGE PREDICTION ENCODING METHOD, IMAGE PREDICTION DECODING METHOD, IMAGE PREDICTION ENCODING PROGRAM, AND IMAGE PREDICTION DECODING PROGRAM

(75) Inventors: Choong Seng Boon, Yokohama (JP); Thiow Keng Tan, Jalan Sindor (SG); Yoshinori Suzuki, Saitama (JP)

(73) Assignee: NTT DoCoMo, Inc., Tokyo (JP)

( * ) Notice: Subject to any disclaimer, the term of this patent is extended or adjusted under 35 U.S.C. 154(b) by 753 days.

(21) Appl. No.: 12/602,949

(22) PCT Filed: Jun. 2, 2008

(86) PCT No.: PCT/JP2008/060146

§ 371 (c)(1),
(2), (4) Date: Apr. 16, 2010

(87) PCT Pub. No.: WO2008/149840

PCT Pub. Date: Dec. 11, 2008

(65) Prior Publication Data

US 2010/0195722 A1 Aug. 5, 2010

(30) Foreign Application Priority Data

Jun. 4, 2007 (JP) ................................ P2007-148459
May 12, 2008 (JP) ................................ P2008-125242

(51) Int. Cl.
*H04N 7/32* (2006.01)
*H04N 7/26* (2006.01)
*H04N 7/34* (2006.01)
*H04N 7/50* (2006.01)

(52) U.S. Cl.
CPC ... *H04N 19/00042* (2013.01); *H04N 19/00763* (2013.01); *H04N 19/00781* (2013.01); *H04N 19/00278* (2013.01); *H04N 19/00157* (2013.01)
USPC ............. 375/240.12; 375/240.13; 375/240.24

(58) Field of Classification Search
None
See application file for complete search history.

(56) References Cited

U.S. PATENT DOCUMENTS 6,148,109 A 11/2000 Boon et al.
2006/0176962 A1 8/2006 Arimura et al.

(Continued)

FOREIGN PATENT DOCUMENTS

JP 2001-028756 A 1/2001
JP 2005-191706 A 7/2005

(Continued)

OTHER PUBLICATIONS

Iain E. Richardson—"Chapter 6: H.264/MPEG4 Part 10", Oct. 17, 2003, John Wiley & Sons, ISBN: 0470848375, pp. 159-223.*

(Continued)

*Primary Examiner* — Joseph Ustaris
*Assistant Examiner* — William Adrovel
(74) *Attorney, Agent, or Firm* — Brinks Gilson & Lione

(57) ABSTRACT

An object is to efficiently depress mode information for identification of a prediction method even if there are a lot of prediction methods provided as to methods of generating intra-frame prediction signals in a pixel domain. An image prediction encoding device 10 has a block dividing unit 102, an intra-frame prediction signal generation method determining unit 105, an intra-frame prediction signal generating unit 106, a subtractor 108, a transform unit 109, a quantization unit 110, and an entropy encoding unit 115; the intra-frame prediction signal generation method determining unit 105 derives an adjacent region prediction method for generation of an intra-frame prediction signal highly correlated with pixel signals of an adjacent region, using a proximate pixel group to a target region, out of a plurality of first prediction methods, and predicts a target region prediction method for target pixel signals, based on the derived adjacent region prediction method; the intra-frame prediction signal generating unit 106 generates an intra-frame prediction signal for the target region, based on the target region prediction method.

20 Claims, 40 Drawing Sheets

(56) References Cited

U.S. PATENT DOCUMENTS

| | | | | |
|---|---|---|---|---|
| 2007/0121731 | A1* | 5/2007 | Tanizawa et al. | 375/240.24 |
| 2009/0232206 | A1 | 9/2009 | Boon et al. | |

FOREIGN PATENT DOCUMENTS

| | | | |
|---|---|---|---|
| JP | 2005-529527 | A | 9/2005 |
| JP | 2006-128770 | A | 5/2006 |
| JP | 2007-096679 | A | 4/2007 |
| JP | 2007-116351 | A | 5/2007 |
| RU | 2369038 | C1 | 9/2009 |
| WO | WO 03-105070 | A1 | 12/2003 |
| WO | WO 2007/046433 | A1 | 4/2007 |

OTHER PUBLICATIONS

Zhong Xue et al: "An Automatic Mode Decision Method for Intra Frame Coding and Decoding", ITU Study Group 16, Nov. 26, 2001, section 1 Figures 1-3.*

Xue, Zhong et al., "An Automated Mode Decision Method for Intra Frame Coding and Decoding Proposal," International Organisation for Standardisation, ISO/IEC JTC1/SC29/WG11, Dec. 2001, 9 pages.

Extended European Search Report for European Application No. 08777097.0, dated Apr. 26, 2011, 8 pages.

International Preliminary Report on Patentability for International Application No. PCT/JP2008/060146, dated Dec. 7, 2009, 4 pages.

International Search Report for International Application No. PCT/JP2008/060146, dated Sep. 2, 2008, 1 page.

Richardson, Iain E.G., "H.264 and MPEG-4 video compression", Wiley, 2003, pp. 177-183.

Office Action from counterpart Russian Application No. 2009148824, dated Sep. 6, 2010, 7 pages (with translation).

Office Action from Canadian Application No. 2,689,277, dated Jan. 4, 2012, 4 pages.

Extended European Search Report for European Application No. 11188559.6, dated Aug. 28, 2012, 7 pages.

European Office Action, dated Dec. 11, 2013, pp. 1-5, European Patent Application No. 11 188 559.6, European Patent Office, Rijswijk, The Netherlands.

* cited by examiner

|   |   |   |   |   |
|---|---|---|---|---|
| M | A | B | C | D | E | F | G | H |
| I | a | b | c | d |
| J | e | f | g | h |
| K | i | j | k | l |
| L | m | n | o | p |

G601 (top row: M A B C D E F G H)
G602 (shaded block: a–p)

```
                    G1403
                    ↓
                    [H]
                    [G]
                    [F]
                    [D][d][h][l][p]
                    [C][c][g][k][o]
                    [B][b][f][j][n]
                    [A][a][e][i][m]
                    [M][I][J][K][L]
```

IMAGE PREDICTION ENCODING DEVICE, IMAGE PREDICTION DECODING DEVICE, IMAGE PREDICTION ENCODING METHOD, IMAGE PREDICTION DECODING METHOD, IMAGE PREDICTION ENCODING PROGRAM, AND IMAGE PREDICTION DECODING PROGRAM

BACKGROUND OF THE INVENTION

1. Technical Field

The present invention relates to an image prediction encoding device, an image prediction decoding device, an image prediction encoding method, an image prediction decoding method, an image prediction encoding program, and an image prediction decoding program.

2. Background Art

For efficiently performing transmission and storage of still image data and moving image data, it is conventional practice to compress the image data by the compression encoding technology. The compression encoding technology for moving images includes the commonly used systems such as MPEG1-4 and H.261-H.264.

In these encoding systems, image data as an object of encoding is first divided into a plurality of blocks and then the encoding process and decoding process are carried out. Furthermore, for further increasing encoding efficiency, the systems such as MPEG4 and H.264 involve a step of encoding a target block in a frame while generating a prediction signal using previously-reproduced pixel signals adjacent to the target block and present in the same frame as the target block. The previously-reproduced pixel signals mean signals restored from image data compressed once. Then the prediction signal is subtracted from pixel signals of the target block to obtain a difference signal and the difference signal is encoded.

In MPEG4, the image signal of the target block is subjected to a discrete cosine transform and then to prediction encoding. Specifically, the discrete cosine transform is to obtain coefficients of a dc component and ac components of the first row or the first column of the target block, coefficients of the same components of a block located above or to the left of the target block are defined as prediction values, and differences between them are encoded. The prediction values are determined based on the magnitude of the gradient of the dc component between a block located obliquely above the target block and the block located above or to the left of the target block. This intra-frame prediction method is described in Patent Document 1 below.

On the other hand, H.264 adopts a method of extrapolating previously-reproduced pixel values adjacent to the target block in predetermined directions to generate prediction signals. This intra-frame prediction signal generation in the pixel domain has the advantage of permitting prediction of particulars of an image. FIG. 39 (*a*) is a schematic diagram for explaining the intra-frame prediction method used in H.264 and FIG. 39 (*b*) shows extending directions of pixel signals in the intra-frame prediction method of H.264. In FIG. 39 (*a*), block 1901 is a target block and blocks 1902 to 1904 are adjacent blocks which are blocks including pixel signals previously reproduced in past processing. In this case, prediction signals are generated in nine directions shown in FIG. 39 (*b*), using a previously-reproduced pixel group 1905 adjacent to a boundary of the target block of block 1901. For example, in the case of direction "0," the prediction signal is generated by downwardly extending adjacent pixels located immediately above block 1901; in the case of direction "1," the prediction signal is generated by rightwardly extending previously-reproduced pixels located to the left of block 1901; in the case of direction "2," the prediction signal is generated as an average of all pixel values of the pixel group 1905. A more specific method for generating the prediction signals is described, for example, in Non-patent Document 1 below. In H.264, differences are calculated between each of the nine prediction signals generated in this manner and the pixel signals of the target block and the generation method of the prediction signal with the smallest difference is defined as an optimum prediction method (or is also called a mode).

In transmission or storage of image data, it is necessary to send identification information indicative of the optimum prediction method determined as described above, to a destination in order to restore the image data. This identification information is encoded with reference to the prediction methods determined for two blocks of block 1902 and block 1903. Specifically, the identification information of the prediction method of block 1902 is compared with the identification information of the prediction method of block 1903 and the smaller is determined as reference mode information. Then the identification information about the optimum prediction method of target block 1901 is encoded relative to the reference mode information.

For more efficiently encoding the identification information about the optimum prediction method, Patent Document 2 discloses a method of generating prediction signals for an adjacent region adjacent to the target block by the same extrapolation methods as in H.264, and then determining the reference mode information. In this method, the extrapolation processing is carried out using a pixel group that is in contact with the adjacent region but in no contact with the target block. FIG. 40 is a schematic diagram for explaining the method used in Patent Document 2. For encoding the identification information about the optimum prediction method of target block 2001, an optimum prediction method is first determined for an adjacent region 2005 adjacent to the target region 2001. Specifically, using a pixel group 2006 adjacent to the adjacent region 2005, a plurality of prediction signals for the adjacent region 2005 are generated by the same nine extrapolation methods as in H.264, a prediction signal showing the highest correlation with pixels of the adjacent region 2005 is determined out of the plurality of prediction signals, and the extrapolation method for generating it is defined as the reference mode information. In this manner the reference mode information is determined using the pixel group in no direct contact with the target block.

Patent Document 1: U.S. Pat. No. 6,148,109

Patent Document 2: Japanese Patent Application Laid-open No. 2007-116351

Non-patent Document 1: kin E. G. Richardson, "H.264 and MPEG-4 video compression," Wiley 2003, pages pp. 177-183.

DISCLOSURE OF THE INVENTION

Problem to be Solved by the Invention

However, the intra-frame prediction signal generation method in the pixel domain like H.264 enables enhancement of prediction accuracy by provision of the many prediction methods (or modes), whereas it requires use of a code with a long code length for encoding the mode information to identify each of the prediction methods, which is a cause to increase a code amount. A method used for alleviating this problem is the method of relatively encoding the information about the prediction method with reference to the mode information about the prediction method of the adjacent block, but, because it uses only two adjacent blocks as described above, it cannot generate accurate reference mode information for the prediction method of the target block. Furthermore, where the blocks adjacent to the target block are encoded by the inter-frame prediction encoding, the adjacent blocks have no prediction information about the intra-frame prediction, and thus a method adopted is to relatively encode the prediction information of the target block with reference to the mode information about a predetermined prediction method. For this reason, where the adjacent blocks are encoded by the inter-frame prediction encoding, the prediction method of the target block cannot be appropriately predicted and therefore the encoding efficiency is poor for the information about the prediction method.

Furthermore, the method of determining the prediction methods for the adjacent region adjacent to the target block, using the pixel group in contact with the adjacent region but in no direct contact with the target block, cannot always be said to be suitable for the target block. The reason is that the prediction signal of the target block is generated using the pixel group in direct contact with the target block (2007 in FIG. 40) but not using the pixel group in contact with the adjacent region but in no contact with the target block (2006 in FIG. 40). Namely, there is a mismatch between the regions used for generation of the prediction signal and it is thus difficult to highly accurately determine the prediction method.

The present invention has been accomplished in order to solve the above problem and an object of the present invention is therefore to provide an encoding method, device, and program capable of efficiently depressing the mode information for identification of the prediction method even if there are a lot of prediction methods provided as to the methods of generation of intra-frame prediction signals in the pixel domain.

Means for Solving the Problem

In order to solve the above problem, an image prediction encoding device according to the present invention is an image prediction encoding device comprising: region dividing means which divides an input image into a plurality of regions; prediction signal generating means which generates an intra-frame prediction signal for target pixel signals included in a target region being a processing object out of the plurality of regions; residual signal generating means which generates a residual signal between the intra-frame prediction signal generated by the prediction signal generating means, and the target pixel signals; and encoding means which encodes the residual signal generated by the residual signal generating means, wherein the prediction signal generating means has a first prediction method determining unit which derives an adjacent region prediction method for generation of an intra-frame prediction signal highly correlated with pixel signals of an adjacent region adjacent to the target region, using at least a part of a proximate pixel group being previously-reproduced pixel signals immediately adjacent to the target region, out of a plurality of predetermined first prediction methods, and wherein the prediction signal generating means predicts a target region prediction method for the target pixel signals, based on the adjacent region prediction method derived by the first prediction method determining unit, and generates the intra-frame prediction signal for the target region, based on the target region prediction method.

An image prediction encoding method according to the present invention is an image prediction encoding method comprising: a region dividing step in which region dividing means divides an input image into a plurality of regions; a prediction signal generating step in which prediction signal generating means generates an intra-frame prediction signal for target pixel signals included in a target region being a processing object out of the plurality of regions; a residual signal generating step in which residual signal generating means generates a residual signal between the intra-frame prediction signal generated by the prediction signal generating means, and the target pixel signals; and an encoding step in which encoding means encodes the residual signal generated by the residual signal generating means, wherein the prediction signal generating step has a first prediction method determining step in which the prediction signal generating means derives an adjacent region prediction method for generation of an intra-frame prediction signal highly correlated with pixel signals of an adjacent region adjacent to the target region, using at least a part of a proximate pixel group being previously-reproduced pixel signals immediately adjacent to the target region, out of a plurality of predetermined first prediction methods, and wherein the prediction signal generating means predicts a target region prediction method for the target pixel signals, based on the adjacent region prediction method derived by the first prediction method determining step, and generates the intra-frame prediction signal for the target region, based on the target region prediction method.

An image prediction encoding program according to the present invention is an image prediction encoding program for letting a computer function as: region dividing means which divides an input image into a plurality of regions; prediction signal generating means which generates an intra-frame prediction signal for target pixel signals included in a target region being a processing object out of the plurality of regions; residual signal generating means which generates a residual signal between the intra-frame prediction signal generated by the prediction signal generating means, and the target pixel signals; and encoding means which encodes the residual signal generated by the residual signal generating means, wherein the prediction signal generating means has a first prediction method determining unit which derives an adjacent region prediction method for generation of an intra-frame prediction signal highly correlated with pixel signals of an adjacent region adjacent to the target region, using at least a part of a proximate pixel group being previously-reproduced pixel signals immediately adjacent to the target region, out of a plurality of predetermined first prediction methods, and wherein the prediction signal generating means predicts a target region prediction method for the target pixel signals, based on the adjacent region prediction method derived by the first prediction method determining unit, and generates the intra-frame prediction signal for the target region, based on the target region prediction method.

The image prediction encoding device, image prediction encoding method, and image prediction encoding program as described above are configured to derive the adjacent region prediction method for generation of the prediction signal highly correlated with the pixel signals of the adjacent region, using the proximate pixel group being the previously-reproduced pixel signals immediately adjacent to the target region as an encoding object, out of the predetermined first prediction methods, to predict the target region prediction method, based on the adjacent region prediction method, and to generate the intra-frame prediction signal of the target region, based on the target region prediction method. This configuration eliminates the need for the identification information (mode information) for identification of the prediction method of the target region or reduces the code amount associated with the identification information, thereby efficiently depressing the mode information for identification of the prediction method. As a result, the mode information to identify the prediction method is reduced even if there are a lot of prediction methods provided as to the methods of generation of the intra-frame prediction signals in the pixel domain, and the total encoding efficiency is improved thereby. Particularly, since the prediction method determined for the adjacent region with reference to the proximate pixel group is highly correlated with the prediction method about the target region determined using the same proximate pixel group, the total code amount is more efficiently reduced.

Preferably, the prediction signal generating means derives as the target region prediction method a prediction method having a predetermined relation with the adjacent region prediction method derived by the first prediction method determining unit. With provision of the prediction signal generating means of this configuration, the target region prediction method is derived from the derived adjacent region prediction method and there is thus no need for use of the mode information for identification of the prediction method of the target region, whereby the total encoding efficiency is more improved.

Preferably, the predetermined relation is a relation in which directions of interpolation of pixel signals in an image signal are opposite to each other. In this case, a prediction method appropriate as the prediction method of the target region is accurately derived from the adjacent region prediction method and thus the code amount of pixel signals is also effectively reduced.

Another preferred configuration is such that the prediction signal generating means further has a second prediction method determining unit which derives a target region prediction method for generation of an intra-frame prediction signal highly correlated with the pixel signals of the target region, using at least a part of the proximate pixel group, out of a plurality of predetermined second prediction methods, and that the prediction signal generating means generates the intra-frame prediction signal for the target region, based on the target region prediction method derived by the second prediction method determining unit, and the prediction signal generating means predicts the target region prediction method, based on the adjacent region prediction method, and generates relative information between information to specify the target region prediction method, and the adjacent region prediction method. When this configuration is adopted, the target region prediction method for generation of the prediction signal highly correlated with the pixel signals of the target region is derived using the proximate pixel group out of the predetermined second prediction methods, the target region prediction method is predicted based on the adjacent region prediction method, and the mode information about the target region prediction method is generated as the relative information to the adjacent region prediction method. This reduces the code amount of the mode information for identification of the target region prediction method by making use of the information predicted based on the adjacent region prediction method, and therefore the mode information for identification of the prediction method is efficiently depressed.

Furthermore, preferably, the plurality of predetermined first prediction methods and the plurality of predetermined second prediction methods have a relation in which directions of interpolation of pixel signals in an image signal are opposite to each other. This configuration enhances the correlation between the derived adjacent region prediction method and the target region prediction method and thus more efficiently depresses the mode information for identification of the prediction method.

Furthermore, preferably, the first prediction method determining unit generates intra-frame prediction signals for the adjacent region of an identical area by the plurality of predetermined first prediction methods, and thereby derives the adjacent region prediction method highly correlated with the adjacent region. In this case, the prediction method highly correlated with the same adjacent region is derived out of the first prediction methods, and thus the correlation is further enhanced between the adjacent region prediction method and the target region prediction method, so as to more efficiently depress the mode information for identification of the prediction method.

An image prediction decoding device according to the present invention is an image prediction decoding device comprising: data analyzing means which extracts encoded data of a residual about a target region as a processing object from compressed data; residual signal restoring means which restores a reproduced residual signal from the encoded data extracted by the data analyzing means; prediction signal generating means which generates an intra-frame prediction signal for target pixel signals included in the target region; and image restoring means which adds the reproduced residual signal restored by the residual signal restoring means, to the intra-frame prediction signal generated by the prediction signal generating means, thereby to restore the target pixel signals included in the target region, wherein the prediction signal generating means has a first prediction method determining unit which derives an adjacent region prediction method for generation of an intra-frame prediction signal highly correlated with pixel signals of an adjacent region adjacent to the target region, using at least a part of a proximate pixel group being previously-reproduced pixel signals immediately adjacent to the target region, out of a plurality of predetermined first prediction methods, and wherein the prediction signal generating means predicts a target region prediction method for the target pixel signals, based on the adjacent region prediction method derived by the first prediction method determining unit, and generates the intra-frame prediction signal for the target region, based on the target region prediction method.

An image prediction decoding method according to the present invention is an image prediction decoding method comprising: a data analyzing step in which data analyzing means extracts encoded data of a residual about a target region as a processing object from compressed data; a residual signal restoring step in which residual signal restoring means restores a reproduced residual signal from the encoded data extracted by the data analyzing means; a prediction signal generating step in which prediction signal generating means generates an intra-frame prediction signal for target pixel signals included in the target region; and an image restoring step in which image restoring means adds the reproduced residual signal restored by the residual signal restoring means, to the intra-frame prediction signal generated by the prediction signal generating means, thereby to restore the target pixel signals included in the target region, wherein the prediction signal generating step has a first prediction method determining step in which the prediction signal generating means derives an adjacent region prediction method for generation of an intra-frame prediction signal highly correlated with pixel signals of an adjacent region adjacent to the target region, using at least a part of a proximate pixel group being previously-reproduced pixel signals immediately adjacent to the target region, out of a plurality of predetermined first prediction methods, and wherein the prediction signal generating means predicts a target region prediction method for the target pixel signals, based on the adjacent region prediction method derived by the first prediction method determining step, and generates the intra-frame prediction signal for the target region, based on the target region prediction method.

An image prediction decoding program according to the present invention is an image prediction decoding program for letting a computer function as: data analyzing means which extracts encoded data of a residual about a target region as a processing object from compressed data; residual signal restoring means which restores a reproduced residual signal from the encoded data extracted by the data analyzing means; prediction signal generating means which generates an intra-frame prediction signal for target pixel signals included in the target region; and image restoring means which adds the reproduced residual signal restored by the residual signal restoring means, to the intra-frame prediction signal generated by the prediction signal generating means, thereby to restore the target pixel signals included in the target region, wherein the prediction signal generating means has a first prediction method determining unit which derives an adjacent region prediction method for generation of an intra-frame prediction signal highly correlated with pixel signals of an adjacent region adjacent to the target region, using at least a part of a proximate pixel group being previously-reproduced pixel signals immediately adjacent to the target region, out of a plurality of predetermined first prediction methods, and wherein the prediction signal generating means predicts a target region prediction method for the target pixel signals, based on the adjacent region prediction method derived by the first prediction method determining unit, and generates the intra-frame prediction signal for the target region, based on the target region prediction method.

The image prediction decoding device, image prediction decoding method, and image prediction decoding program as described above are configured to derive the adjacent region prediction method for generation of the prediction signal highly correlated with the pixel signals of the adjacent region, using the proximate pixel group being the previously-reproduced pixel signals immediately adjacent to the target region as an encoding object, out of the predetermined first prediction methods, to predict the target region prediction method, based on the adjacent region prediction method, and to generate the intra-frame prediction signal of the target region, based on the target region prediction method. This configuration eliminates the need for use of the identification information (mode information) for identification of the prediction method of the target region in the compressed data of the reproduced object or reduces the code amount associated with the identification information, whereby the mode information for identification of the prediction method is efficiently depressed. As a result, the mode information for identification of the prediction method is reduced even if there are a lot of prediction methods provided as to the methods of generation of the intra-frame prediction signals in the pixel domain, and the total encoding efficiency of the compressed data is improved thereby. Particularly, since the prediction method determined for the adjacent region with reference to the proximate pixel group is highly correlated with the prediction method about the target region determined using the same proximate pixel group, the total code amount of the compressed data is more efficiently reduced.

Preferably, the prediction signal generating means derives as the target region prediction method a prediction method having a predetermined relation with the adjacent region prediction method derived by the first prediction method determining unit. With provision of the prediction signal generating means of this configuration, the target region prediction method is derived from the derived adjacent region prediction method and there is thus no need for the mode information for identification of the prediction method of the target region in the compressed data, whereby the total encoding efficiency of the compressed data is more improved.

Preferably, the predetermined relation is a relation in which directions of interpolation of pixel signals in an image signal are opposite to each other. In this case, a prediction method appropriate as the prediction method of the target region is accurately derived from the adjacent region prediction method and therefore the code amount of pixel signals in the compressed data is also effectively reduced.

Furthermore, preferably, the data analyzing means further extracts relative prediction method information for identifying a target region prediction method for generation of the intra-frame prediction signal from the compressed data, and the prediction signal generating means predicts the target region prediction method, based on the adjacent region prediction method derived by the first prediction method determining unit, thereby to restore the target region prediction method from the adjacent region prediction method and the relative prediction method information, and generates the intra-frame prediction signal using the proximate pixel group, based on the target region prediction method. In this configuration, the target region prediction method is predicted based on the adjacent region prediction method and the target region prediction method is restored based on the relative prediction method information being the relative information to the adjacent region prediction method of mode information about the target region prediction method, and the adjacent region prediction method. This reduces the code amount of the mode information for identification of the target region prediction method in the compressed data by making use of the information predicted based on the adjacent region prediction method and therefore efficiently depresses the mode information for identification of the prediction method in the compressed data.

Furthermore, preferably, the first prediction method determining unit generates intra-frame prediction signals for the adjacent region of an identical area by the plurality of predetermined first prediction methods, and thereby derives the adjacent region prediction method highly correlated with the adjacent region. In this case, since the prediction method highly correlated with the same adjacent region is derived out of the first prediction methods, the correlation is more enhanced between the adjacent region prediction method and the target region prediction method and therefore the mode information for identification of the prediction method is more efficiently depressed.

Effect of the Invention

The present invention permits efficient depression of the mode information for identification of the prediction method even if there are a lot of prediction methods provided as to the methods of generation of the intra-frame prediction signals in the pixel domain.

LIST OF REFERENCE SYMBOLS

10 image prediction encoding device; 50 image prediction decoding device; 102 block dividing unit (region dividing means); 105, 305 intra-frame prediction signal generation method determining unit (prediction signal generating means); 106 intra-frame prediction signal generating unit (prediction signal generating means); 108 subtractor (residual signal generating means); 109 transform unit (encoding means); 110 quantization unit (encoding means); 115 entropy encoding unit (encoding means); 201, 301 prediction method determining unit (second prediction method determining unit); 202 prediction signal generating unit (second prediction method determining unit); 206 adjacent mode determining unit (first prediction method determining unit); 501 data analyzing unit (data analyzing means); 502 inverse quantization unit (residual signal restoring means); 503 inverse transform unit (residual signal restoring means); 504 adder (image restoring means); 505 intra-frame prediction signal generating unit (prediction signal generating means); 507 intra-frame prediction method acquiring unit (prediction signal generating means); 601 adjacent mode determining unit (first prediction method determining unit).

BEST MODE FOR CARRYING OUT THE INVENTION

Preferred embodiments of the image prediction encoding device and the image prediction decoding device according to the present invention will be described below in detail with reference to the drawings.

(Image Prediction Encoding Device)

Figure 1:
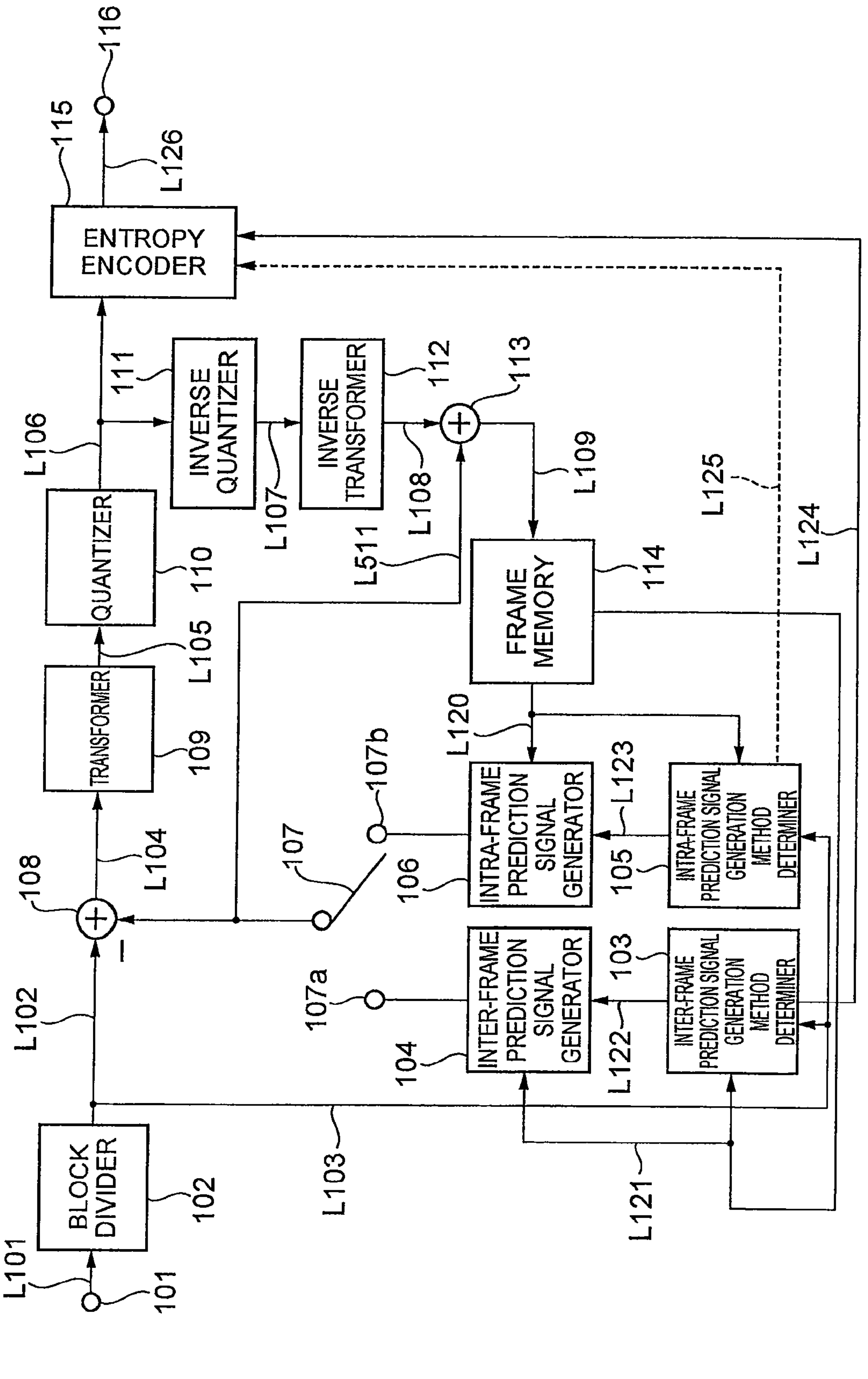
FIG. 1 is a block diagram showing a configuration of an image prediction encoding device according to a preferred embodiment of the present invention.

FIG. 1 is a block diagram showing a configuration of an image prediction encoding device according to a preferred embodiment of the present invention. The image prediction encoding device 10 shown in the same drawing is constructed with an input terminal 101, a block dividing unit (region dividing means) 102, an inter-frame prediction signal generation method determining unit 103, an inter-frame prediction signal generating unit 104, an intra-frame prediction signal generation method determining unit (prediction signal generating means) 105, an intra-frame prediction signal generating unit (prediction signal generating means) 106, a changeover switch 107, a subtractor (residual signal generating means) 108, a transform unit (encoding means) 109, a quantization unit (encoding means) 110, an inverse quantization unit 111, an inverse transform unit 112, an adder 113, a frame memory 114, an entropy encoding unit (encoding means) 115, and an output terminal 116. Each of the components of the image prediction encoding device 10 will be described below.

The block dividing unit 102 receives an input of a moving image signal consisting of a plurality of pictures as frames from the input terminal 101 and divides a picture as an object of encoding into a plurality of regions. Specifically, the block dividing unit 102 divides a picture into blocks each consisting of 8×8 pixels, but it may be configured to divide a picture into blocks of any size and shape different therefrom. The block dividing unit 102 outputs pixel signals (hereinafter referred to as "target pixel signals") of a region as an object of an encoding process (hereinafter referred to as a "target block") out of pixel signals of the divided blocks, via a line L102 to the subtractor 108 and via a line L103 to the inter-frame prediction signal generation method determining unit 103 and to the intra-frame prediction signal generation method determining unit 105.

Each of the inter-frame prediction signal generating unit 104 and the intra-frame prediction signal generating unit 106 generates, for the target pixel signals of the target block, a prediction signal as a prediction of an image thereof. At this time, the prediction signal is generated using two types of prediction methods. Namely, the inter-frame prediction signal generating unit 104 uses the prediction method called "inter-frame prediction" in generation of the prediction signal, while the intra-frame prediction signal generating unit 106 uses the prediction method called "intra-frame prediction." In the "inter-frame prediction," a reproduced image having been encoded and then restored is used as a reference image and a prediction method is determined by finding motion information to produce a prediction signal with the smallest error from the reference image to the target block (which will be referred to as a "motion detection" process). In contrast to it, the "intra-frame prediction" is to generate an intra-frame prediction signal by a predetermined method using previously-reproduced pixel values spatially adjacent to the target block, and this prediction method is also applicable to encoding and decoding of still images.

The inter-frame prediction signal generation method determining unit 103 performs the aforementioned motion detection, based on the target pixel signals of the target block input via the line L103 and the reference image input via a line L121 from the frame memory 114, thereby to determine an inter-frame prediction method. The inter-frame prediction signal generation method determining unit 103 may be configured to redivide the target block into sub-blocks and to determine an inter-frame prediction method for each redivided sub-block, whereby it can select a most efficient division method for the entire target block out of a variety of region division methods and determine motion information of each sub-block. The reference image to be used herein may be a plurality of images having been encoded and then restored. This motion detection method is substantially the same as one of the conventional methods in MPEG-2, MPEG-4, and H.264, and thus the detailed description thereof is omitted herein. The inter-frame prediction signal generation method determining unit 103 outputs the determined motion information and the way of division into sub-blocks via a line L122 to the inter-frame prediction signal generating unit 104 and via a line L124 to the entropy encoding unit 115. Receiving the data, the inter-frame prediction signal generating unit 104 generates a prediction signal, based on the way of division into sub-blocks, the motion information corresponding to each of the sub-blocks, and the reference image acquired from the frame memory 114, and sends the prediction signal via a terminal 107*a* and the changeover switch 107 to the subtractor 108 and the adder 113.

The intra-frame prediction signal generation method determining unit 105 determines a prediction method (also called an interpolation method) in the intra-frame prediction, based on the target pixel signals of the target block input via the line L103 and the reference image input via a line L120 from the frame memory 114. The details of the processing of the intra-frame prediction signal generation method determining unit 105 will be described later, but the processing herein uses a method of interpolation using a plurality of pixels immediately adjacent to the target block. The intra-frame prediction signal generation method determining unit 105 sends information to identify the determined prediction method (hereinafter referred to as "mode information"), via a line L123 to the intra-frame prediction signal generating unit 106 and via a line L125 to the entropy encoding unit 115. Receiving the data, the intra-frame prediction signal generating unit 106 generates a prediction signal in accordance with the prediction method specified by the mode information, based on the mode information about the prediction method and the previously-reproduced pixel signals present in the same frame acquired from the frame memory 114 and immediately adjacent to the target block, and sends the prediction signal via a terminal 107*b* and the changeover switch 107 to the subtractor 108 and the adder 113.

The changeover switch 107 determines which of the prediction signals sent from the inter-frame prediction signal generating unit 104 and from the intra-frame prediction signal generating unit 106 produces a smaller error with respect to the target pixel signals of the target region, selects the prediction signal with the smaller error in accordance with the determination result, and outputs the prediction signal to the subtractor 108 and the adder 113. However, in the case where for the first frame all the target blocks are processed by the intra-frame prediction because of the absence of any past image, the changeover switch 107 is always connected to the terminal 107*b* on the intra-frame prediction signal generating unit 106 side on the occasion of processing the first image. Similarly, in cases where a frame immediately after a scene end is processed and where an image of intra-frame prediction needs to be periodically introduced, the changeover switch 107 can also be configured to select only the prediction signal by the intra-frame prediction for a frame.

The subtractor 108 subtracts the prediction signal input via the changeover switch 107, from the target pixel signals of the target block input from the block dividing unit 102, to generate a residual signal. This residual signal is output via a line L104 to the transform unit 109 and the transform unit 109 performs a discrete cosine transform of this residual signal to generate transform coefficients. The transform coefficients are output via a line L105 to the quantization unit 110, and the quantization unit 110 quantizes the transform coefficients and then outputs the quantized data via a line L106 to the entropy encoding unit 115 and to the inverse quantization unit 111. The entropy encoding unit 115 encodes the quantized transform coefficients and outputs the encoded data, together with the motion information and the division method into sub-blocks output from the inter-frame prediction signal generation method determining unit 103 or with the information about the prediction method output from the intra-frame prediction signal generation method determining unit 105, via a line L126 to the output terminal 116.

The inverse quantization unit 111 performs inverse quantization of the quantized transform coefficients into the transform coefficients and outputs the transform coefficients via a line L107 to the inverse transform unit 112, and the inverse transform unit 112 performs an inverse discrete cosine transform of the transform coefficients to restore the residual signal. The adder 113 adds the residual signal to the prediction signal input via a line L511, to reproduce the target pixel signals of the target block, and stores the result via a line L109 into the frame memory 114. The target pixel signals of the target block stored in the frame memory 114 are used for generating a prediction signal of a target block to be processed next, by the inter-frame prediction or the intra-frame prediction.

Figure 2:
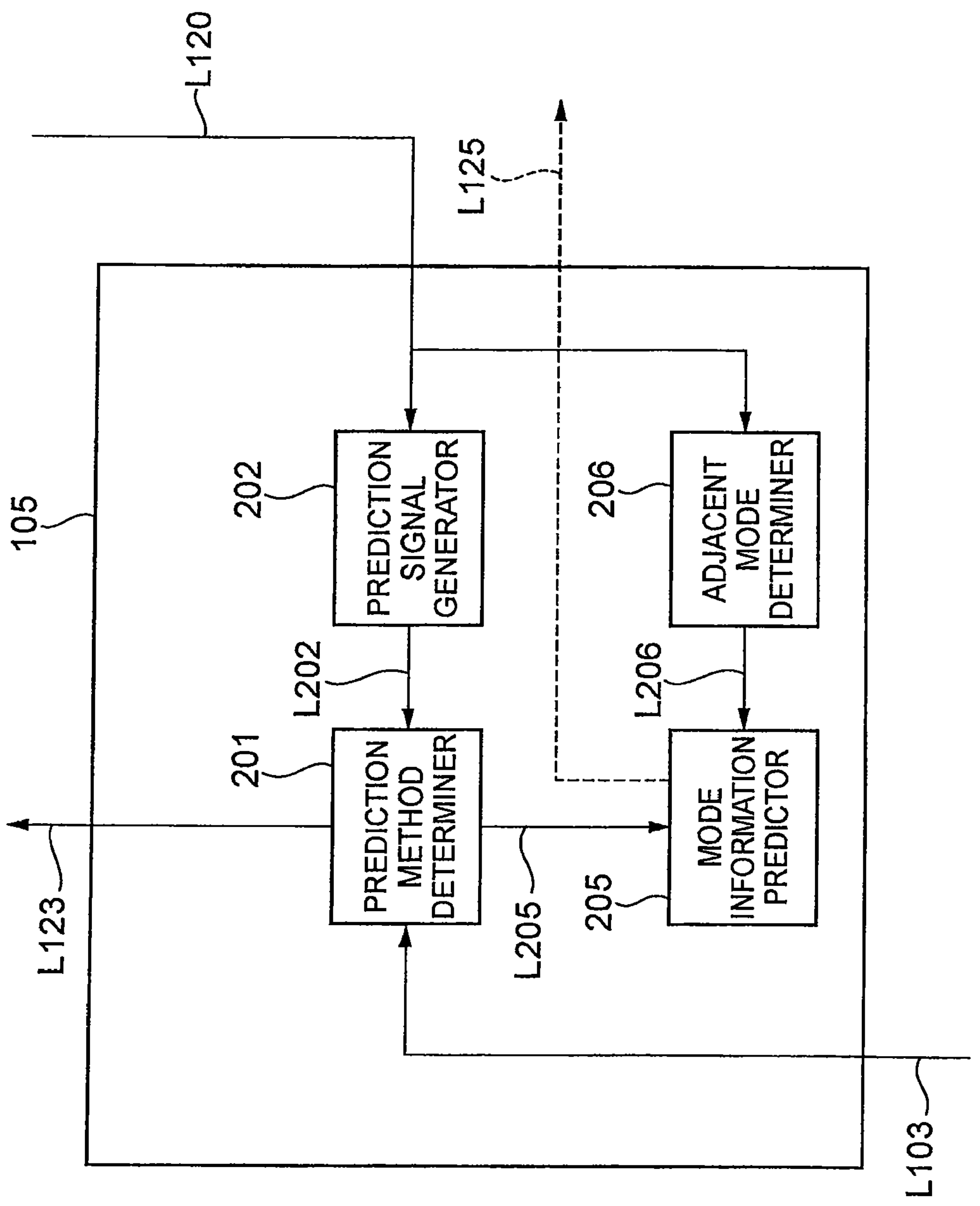
FIG. 2 is a block diagram showing a configuration of an intra-frame prediction signal generation method determining unit shown in FIG. 1.

The configuration of the intra-frame prediction signal generation method determining unit 105 will be described below in more detail. FIG. 2 is a block diagram showing the configuration of the intra-frame prediction signal generation method determining unit 105. As shown in the same drawing, the intra-frame prediction signal generation method determining unit 105 has a prediction method determining unit (second prediction method determining unit) 201, a prediction signal generating unit (second prediction method determining unit) 202, an adjacent mode determining unit (first prediction method determining unit) 206, and a mode information predicting unit 205.

Figure 3:
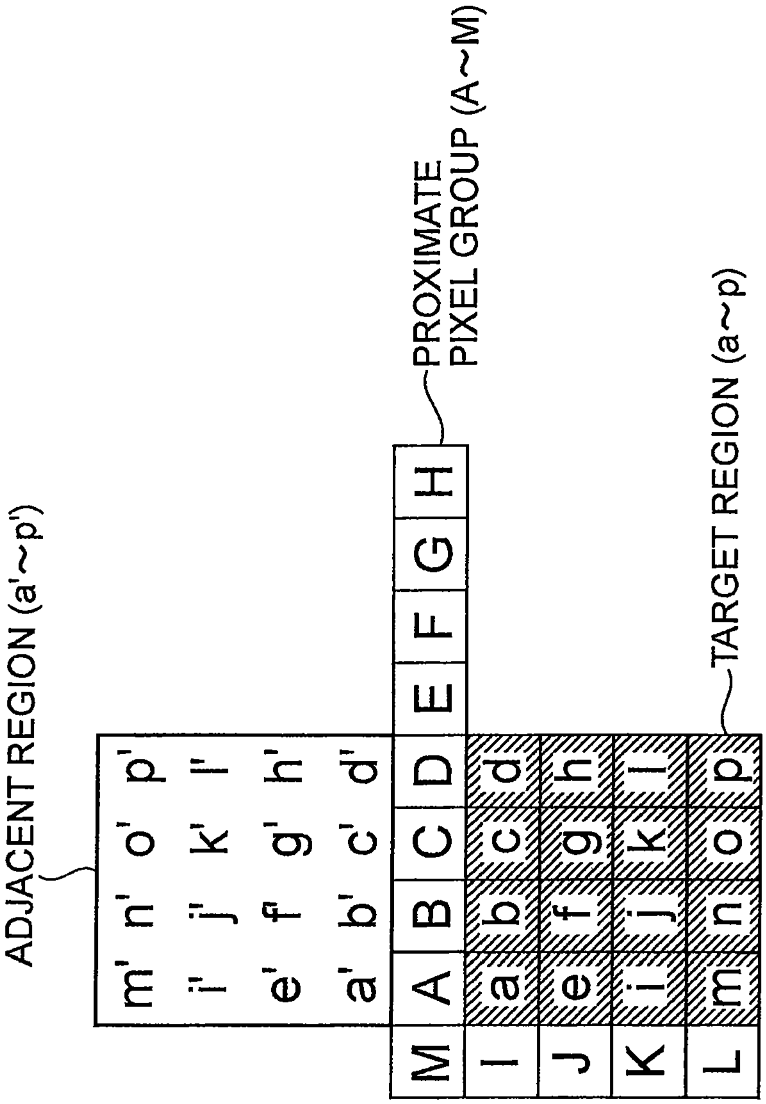
FIG. 3 is a drawing showing a pixel arrangement of pixel signals as a processing object of the image prediction encoding device shown in FIG. 1.

The prediction signal generating unit 202 generates prediction signals by nine methods (second prediction methods), using a proximate pixel group retrieved via the line L120 from the frame memory 114. The "proximate pixel group" herein refers to a plurality of previously-reproduced pixels immediately adjacent to a target block. For example, in an example of an image of an identical frame shown in FIG. 3, the proximate pixel group is pixel signals A-M immediately adjacent to pixel signals a-p of a target region.

Figure 4:
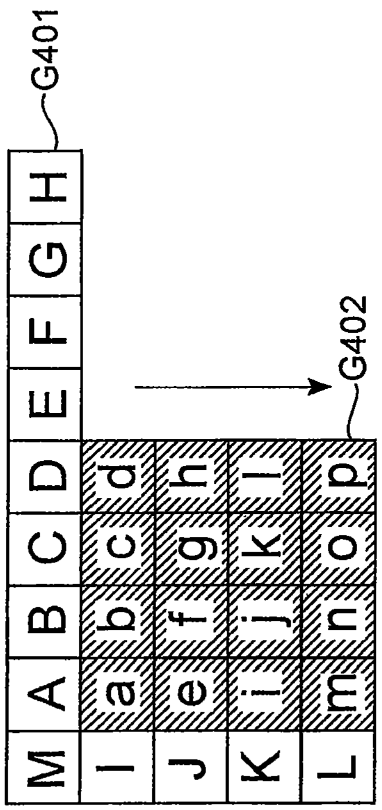
FIG. 4 is a schematic diagram for explaining a prediction method by a prediction signal generating unit shown in FIG. 2.

FIGS. 4 to 12 are conceptual diagrams showing the methods of generating the prediction signals by the prediction signal generating unit 202. For example, in FIG. 4, each cell represents a pixel, a pixel group G401 of pixels A-M is a proximate pixel group, and a pixel group G402 of pixels a-p is pixels included in a target block. Specifically, the prediction signal generating unit 202 generates the prediction signal by downwardly extending each pixel, using the pixels A-D in the proximate pixel group G401, for the pixel group G402 in the target block, as shown in FIG. 4. Specific operation expressions to be used in this case are Formulas (1) below. In Formulas (1) below, "pred(a,e,i,m)=A" means that a prediction value of pixels a, e, i, and m in the target block G402 is set to a value of pixel A.

$$\mathrm{pred}(a,e,i,m)=A,\ \mathrm{pred}(b,f,j,n)=B,$$

$$\mathrm{pred}(c,g,k,o)=C,\ \mathrm{pred}(d,h,l,p)=D \tag{1}$$

Figure 5:
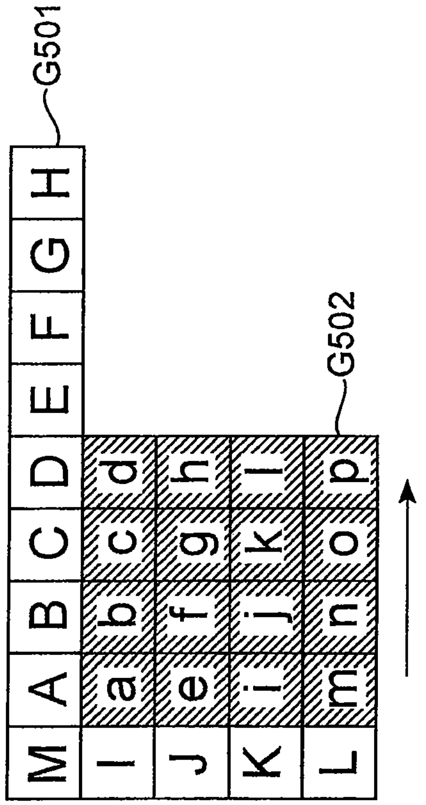
FIG. 5 is a schematic diagram for explaining a prediction method by the prediction signal generating unit shown in FIG. 2.

Furthermore, the prediction signal generating unit 202 generates the prediction signal by rightwardly extending each pixel, using some pixels I, J, K, and L out of the pixels in the proximate pixel group G501, for the pixel group G502 in the target block, as shown in FIG. 5. Specific operation expressions to be used in this case are Formulas (2) below. Similarly, the prediction signal generating unit 202 generates the prediction signals according to Formulas (3) to (9) below by extending pixels in predetermined directions, using a part of the proximate pixel group G601, . . . , G1201, for the pixel group G602, . . . , G1202 in the target block, as shown in FIGS. 6 to 12.

$$\mathrm{pred}(a,b,c,d)=I,\ \mathrm{pred}(e,f,g,h)=J,$$

$$\mathrm{pred}(i,j,k,l)=K,\ \mathrm{pred}(m,n,o,p)=L \tag{2}$$

$$\mathrm{pred}(a,b,c,d,e,f,g,h,i,j,k,l,m,n,o,p)=[A+B+C+D+I+J+K+L+4]/8 \tag{3}$$

$$\mathrm{pred}(a)=(A+2B+C+2)/4,$$

$$\mathrm{pred}(b,e)=(B+2C+D+2)/4,$$

$$\mathrm{pred}(c,f,i)=(C+2D+E+2)/4,$$

$$\mathrm{pred}(d,g,j,m)=(D+2E+F+2)/4,$$

$$\mathrm{pred}(h,k,n)=(E+2F+G+2)/4,$$

$$\mathrm{pred}(o,l)=(F+2G+H+2)/4,$$

$$\mathrm{pred}(p)=(G+3H+2)/4 \tag{4}$$

$$\mathrm{pred}(a,f,k,p)=(I+2M+A+2)/4,$$

$$\mathrm{pred}(b,g,l)=(M+2A+B+2)/4,$$

$$\mathrm{pred}(c,h)=(A+2B+C+2)/4,$$

$$\mathrm{pred}(d)=(B+2C+D+2)/4,$$

$$\mathrm{pred}(e,j,o)=(M+2I+J+2)/4,$$

$$\mathrm{pred}(i,n)=(I+2J+K+2)/4,$$

$$\mathrm{pred}(m)=(J+2K+L+2)/4 \tag{5}$$

$$\mathrm{pred}(a,j)=(M+A+1)/2,$$

$$\mathrm{pred}(b,k)=(A+B+1)/2,$$

$$\mathrm{pred}(c,l)=(B+C+1)/2,$$

$$\mathrm{pred}(d)=(C+D+1)/2,$$

$$\mathrm{pred}(e,l\ n)=(I+2M+A+2)/4,$$

$$\mathrm{pred}(f,o)=(M+2A+B+2)/4,$$

$$\text{pred}(g,p)=(A+2B+C+2)/4,$$

$$\text{pred}(h)=(B+2C+D+2)/4,$$

$$\text{pred}(i)=(M+21+J+2)/4,$$

$$\text{pred}(m)=(I+2J+K+2)/4 \tag{6}$$

$$\text{pred}(a,g)=(M+I+1)/2,$$

$$\text{pred}(b,h)=(I+2M+A+2)/4,$$

$$\text{pred}(c)=(M+2A+B+2)/4,$$

$$\text{pred}(d)=(A+2B+C+2)/4,$$

$$\text{pred}(e,k)=(I+J+1)/2,$$

$$\text{pred}(f,l)=(M+21+J+2)/4,$$

$$\text{pred}(i,o)=(J+K+1)/2,$$

$$\text{pred}(j,p)=(I+2J+K+2)/4,$$

$$\text{pred}(m)=(K+L+1)/2,$$

$$\text{pred}(n)=(J+2K+L+2)/4 \tag{7}$$

$$\text{pred}(a)=(A+B+1)/2,$$

$$\text{pred}(b,i)=(B+C+1)/2,$$

$$\text{pred}(c,j)=(C+D+1)/2,$$

$$\text{pred}(d,k)=(D+E+1)/2,$$

$$\text{pred}(e)=(A+2B+C+2)/4,$$

$$\text{pred}(f,m)=(B+2C+D+2)/4,$$

$$\text{pred}(g,n)=(C+2D+E+2)/4,$$

$$\text{pred}(h,o)=(D+2E+F+2)/4,$$

$$\text{pred}(l)=(E+F+1)/2,$$

$$\text{pred}(p)=(E+2F+G+2)/4 \tag{8}$$

$$\text{pred}(a)=(I+J+1)/2,$$

$$\text{pred}(b)=(I+2J+K+2)/4,$$

$$\text{pred}(c,e)=(J+K+1)/2,$$

$$\text{pred}(d,f)=(J+2K+L+2)/4,$$

$$\text{pred}(g,i)=(K+L+1)/2,$$

$$\text{pred}(h,j)=(K+3L+2)/4,$$

$$\text{pred}(k,m)=L,\ \text{pred}(l,n)=L,\ \text{pred}(o)=L,\ \text{pred}(p)=L \tag{9}$$

Referring back to FIG. 2, the prediction signal generating unit 202 sends the nine prediction signals generated as described above, via a line L202 to the prediction method determining unit 201. The prediction signal generating unit 202 herein is configured to use the target block consisting of 4×4 pixels, but it may also be configured to use a block consisting of any number of pixels other than it, as the target block. In that case, the proximate pixel group can be defined in accordance with the target block. The prediction methods to be employed do not have to be limited to the above-described nine prediction methods of prediction signals, but it is also possible to generate more or fewer prediction signals, or to generate the prediction signals by other prediction methods, e.g., spline extrapolation.

When the prediction method determining unit 201 receives an input of target pixel signals of a target block via the line L103, it calculates differences of the nine prediction signals sent via the line L202, from the signal of the target block and determines a prediction signal to provide the smallest difference, as an optimum prediction signal. Besides, the prediction method determining unit 201 derives as a target region prediction method a prediction method that provides the optimum prediction signal determined to be the intra-frame prediction signal highly correlated with the target pixel signals as described above. Furthermore, the prediction method determining unit 201 sends the mode information about this target region prediction method via the line L123 to the intra-frame prediction signal generating unit 106 (cf. FIG. 1) and via a line L205 to the mode information predicting unit 205. Receiving it, the intra-frame prediction signal generating unit 106 generates the prediction signal of the target block using the proximate pixel group by the foregoing method in accordance with the mode information.

Figure 13:
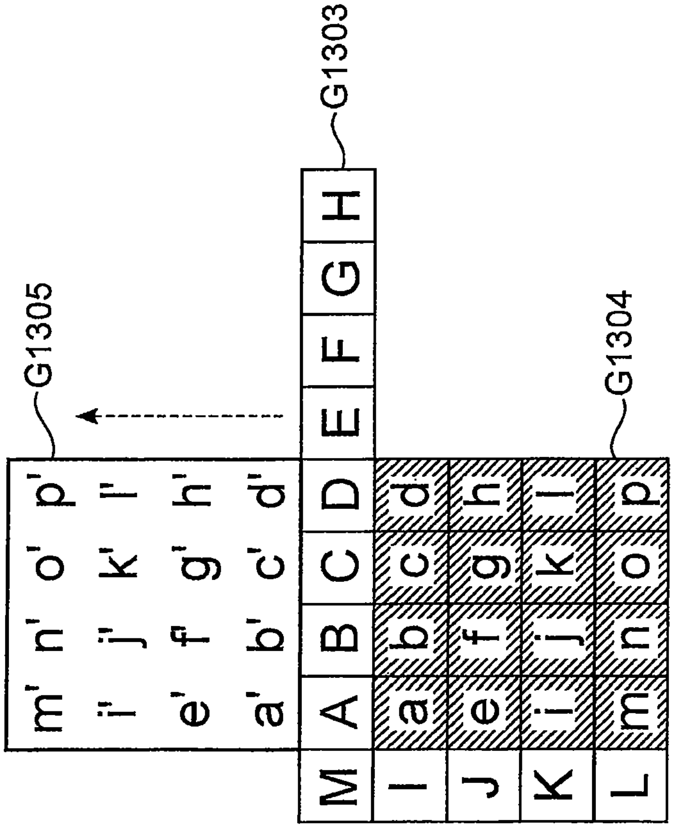
FIG. 13 is a schematic diagram for explaining a prediction method by an adjacent mode determining unit shown in FIG. 2.

The adjacent mode determining unit 206 derives a prediction method that generates an intra-frame prediction signal highly correlated with the pixel signals of the adjacent region in the input image. At this time, the adjacent mode determining unit 206 uses nine prediction methods (first prediction methods) for the adjacent region, corresponding to the second prediction methods (FIG. 4 to FIG. 12) being the prediction methods about the target region. FIGS. 13 to 21 are conceptual diagrams showing the methods of generating the prediction signals by the adjacent mode determining unit 206. For example, in FIG. 13, a pixel group G1304 of pixels a-p are pixels included in a target block, a pixel group 1303 of pixels A-M is a proximate pixel group, and a pixel group G1305 of pixels a'-p' is pixels included in an adjacent region adjacent to the target block with the proximate pixel group in between. Each of pixel values of the adjacent region G1305 and the proximate pixel group G1303 are input via the line L120. Specifically, the adjacent mode determining unit 206 generates the prediction signal by upwardly extending each pixel, using pixels A-D in the proximate pixel group G1303, for the pixel group G1305 in the adjacent region, as shown in FIG. 13. Specific operation expressions to be used in this case are Formulas (10) below.

$$\text{pred}(a',e',i',m')=A,$$

$$\text{pred}(b',f',j',n')=B,$$

$$\text{pred}(c',g',k',o')=C,$$

$$\text{pred}(d',h',l',p')=D \tag{10}$$

Figure 14:
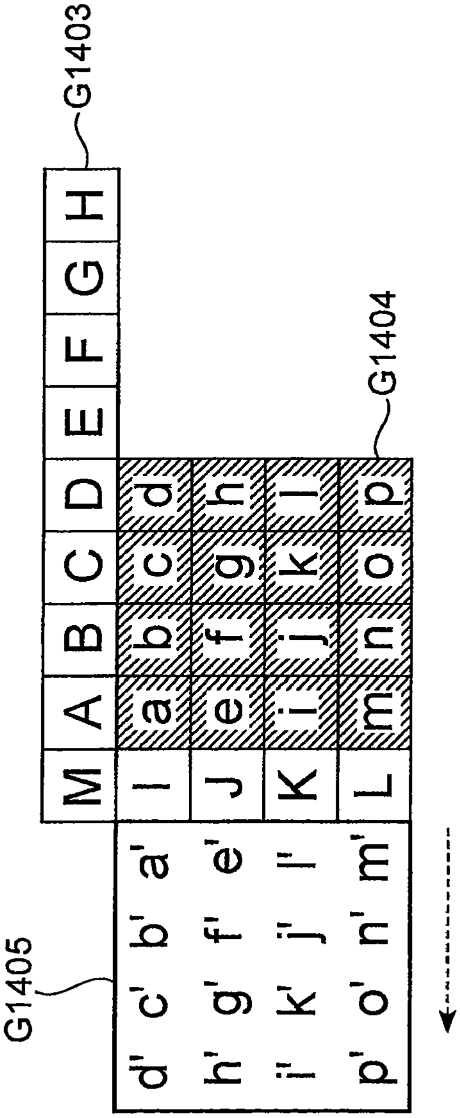
FIG. 14 is a schematic diagram for explaining a prediction method by the adjacent mode determining unit shown in FIG. 2.

Furthermore, the adjacent mode determining unit 206 generates the prediction signal by leftwardly extending each pixel, using some pixels I, J, K, and L out of those of the proximate pixel group G1403, for the pixel group G1405 in the adjacent region, as shown in FIG. 14. Specific operation expressions to be used in this case are Formulas (11) below. Similarly, the adjacent mode determining unit 206 generates the prediction signals by Formulas (12) to (18) below by extending pixels in predetermined directions, using a part of the proximate pixel group G1503, . . . , G2103, for the pixel group G1505, . . . , G2105 in the adjacent region, as shown in FIGS. 15 to 21. In only the prediction method shown in FIG. 15, however, an average of pixels A-D, I-L being the proximate pixel group G1503 is used as a prediction signal of the pixels A-D, I-L, e', f', g', h', a', e'', i', and m' being the pixel group G1505 of the adjacent region.

$$\mathrm{pred}(a',b',c',d')=I,$$

$$\mathrm{pred}(e',f',g',h')=J,$$

$$\mathrm{pred}(i',j',k',l')=K,$$

$$\mathrm{pred}(m',n',o',p')=L \quad (11)$$

$$\mathrm{pred}(A,B,C,D,e',f',g',h',I,J,K,L,a',e'',i',m')=[A+B+C+D+I+J+K+L+4]/8 \quad (12)$$

$$\mathrm{pred}(a',j',i')=(3M+A+2)/4,$$

$$\mathrm{pred}(b',k')=(M+2A+B+2)/4,$$

$$\mathrm{pred}(c',l')=(A+2B+C+2)/4,$$

$$\mathrm{pred}(d',m')=(B+2C+D+2)/4,$$

$$\mathrm{pred}(e',n')=(C+2D+E+2)/4,$$

$$\mathrm{pred}(f',o')=(D+2E+F+2)/4,$$

$$\mathrm{pred}(g',p')=(E+2F+G+2)/4,$$

$$\mathrm{pred}(h')=(F+2G+H+2)/4 \quad (13)$$

$$\mathrm{pred}(a',g')=(I+2M+A+2)/4,$$

$$\mathrm{pred}(b',h')=(M+2A+B+2)/4,$$

$$\mathrm{pred}(c',I')=(A+2B+C+2)/4,$$

$$\mathrm{pred}(d',j')=(B+2C+D+2)/4,$$

$$\mathrm{pred}(e')=(C+3DI+2)/4,$$

$$\mathrm{pred}(f',l')=(M+2I+J+2)/4,$$

$$\mathrm{pred}(k',n')=(I+2J+K+2)/4,$$

$$\mathrm{pred}(m',p')=(J+2K+L+2)/4,$$

$$\mathrm{pred}(o')=(K+3L+2)/4 \quad (14)$$

$$\mathrm{pred}(g')=(I+2M+A+2)/4,$$

$$\mathrm{pred}(h')=(M+2A+B+2)/4,$$

$$\mathrm{pred}(c,i')=(A+2B+C+2)/4,$$

$$\mathrm{pred}(d',l')=(M+A+1)/2,$$

$$\mathrm{pred}(e',m')=(A+B+1)/2,$$

$$\mathrm{pred}(f',n')=(B+C+1)/2,$$

$$\mathrm{pred}(j')=(B+2C+D+2)/4,$$

$$\mathrm{pred}(a',k')=(M+21+J+2)/4,$$

$$\mathrm{pred}(c',o')=(C+D+1)/2,$$

$$\mathrm{pred}(b',p')=(I+2J+K+2)/4 \quad (15)$$

$$\mathrm{pred}(a',g')=(M+I+1)/2,$$

$$\mathrm{pred}(b')=(I+2M+A+2)/4,$$

$$\mathrm{pred}(c',n')=(M+2A+B+2)/4,$$

$$\mathrm{pred}(d',o')=(A+2B+C+2)/4,$$

$$\mathrm{pred}(e',j')=(I+J+1)/2,$$

$$\mathrm{pred}(f')=(M+21+J+2)/4,$$

$$\mathrm{pred}(h',m')=(J+K+1)/2,$$

$$\mathrm{pred}(i')=(I+2J+K+2)/4,$$

$$\mathrm{pred}(k',p')=(K+L+1)/2,$$

$$\mathrm{pred}(l')=(J+2K+L+2)/4 \quad (16)$$

$$\mathrm{pred}(a',k')=(A+B+1)/2,$$

$$\mathrm{pred}(b',l')=(B+C+1)/2,$$

$$\mathrm{pred}(c',m')=(C+D+1)/2,$$

$$\mathrm{pred}(d',n')=(D+E+1)/2,$$

$$\mathrm{pred}(e',o')=(E+F+1)/2,$$

$$\mathrm{pred}(f')=(A+2B+C+2)/4,$$

$$\mathrm{pred}(g')=(B+2C+D+2)/4,$$

$$\mathrm{pred}(h')=(C+2D+E+2)/4,$$

$$\mathrm{pred}(i')=(D+2E+F+2)/4,$$

$$\mathrm{pred}(j')=(E+2F+G+2)/4,$$

$$\mathrm{pred}(p')=(F+G+1)/2 \quad (17)$$

$$\mathrm{pred}(a')=I,$$

$$\mathrm{pred}(b')=I,$$

$$\mathrm{pred}(c',e')=I,$$

$$\mathrm{pred}(d',f')=I,$$

$$\mathrm{pred}(g',I')=(3I+J+2)/4,$$

$$\mathrm{pred}(h',j')=(I+J+1)/2,$$

$$\mathrm{pred}(k',m')=(I+2J+K+2)/4,$$

$$\mathrm{pred}(l',n')=(J+K+1)/2,$$

$$\mathrm{pred}(o')=(J+2K+L+2)/4,$$

$$\mathrm{pred}(p')=(K+L+1)/2 \quad (18)$$

Then the adjacent mode determining unit 206 calculates differences between the prediction signals generated by the above nine prediction methods and pixel values that the adjacent region originally has, and defines the differences as correlation values between the respective prediction signals and the pixel signals. For example, such a correlation value can be a sum of absolute difference signals of respective pixels. Furthermore, the adjacent mode determining unit 206 determines a prediction method with the highest correlation value out of the determined correlation values corresponding to the nine prediction methods. Specifically, the adjacent mode determining unit 206 determines a prediction method with the smallest correlation value determined as a difference sum between the prediction signal and the original signal, as a mode with the highest correlation and derives it as an optimum prediction method for the adjacent region (adjacent region prediction method). Then the adjacent mode determining unit 206 sends the information about the adjacent region prediction method via a line L206 to the mode information predicting unit 205.

Figure 6:
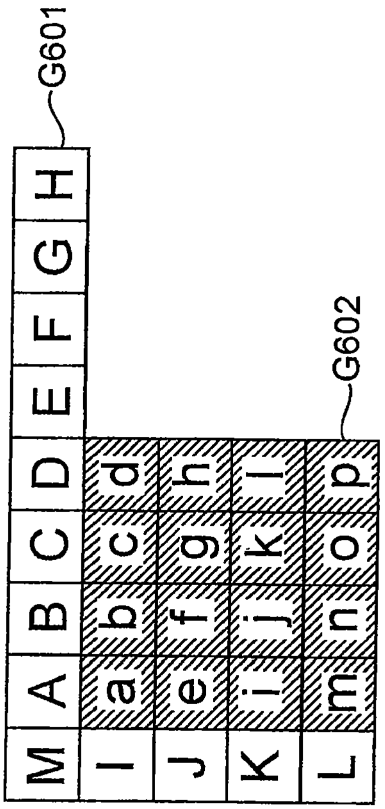
FIG. 6 is a schematic diagram for explaining a prediction method by the prediction signal generating unit shown in FIG. 2.
Figure 7:
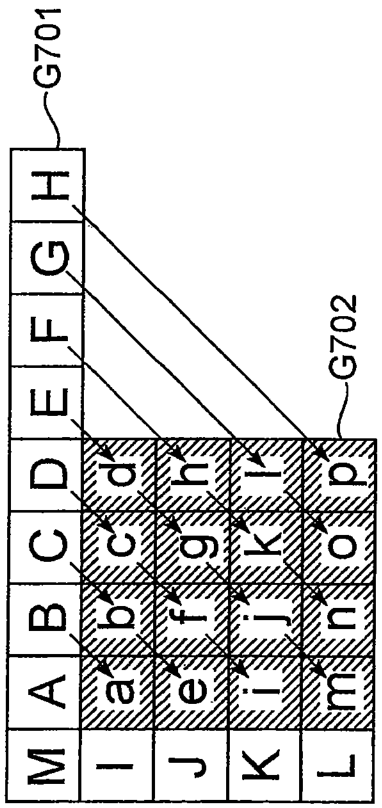
FIG. 7 is a schematic diagram for explaining a prediction method by the prediction signal generating unit shown in FIG. 2.
Figure 8:
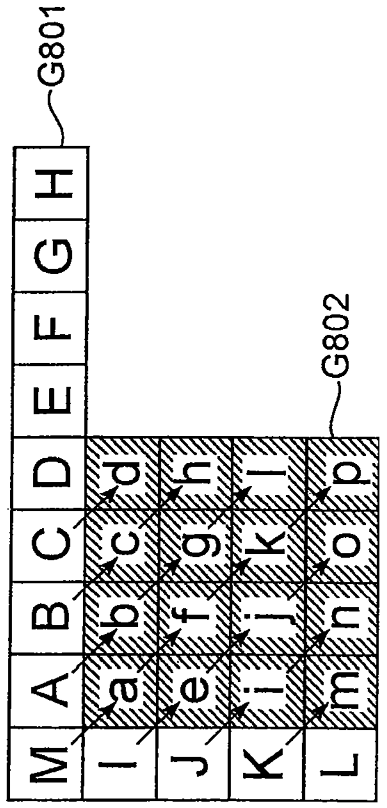
FIG. 8 is a schematic diagram for explaining a prediction method by the prediction signal generating unit shown in FIG. 2.
Figure 9:
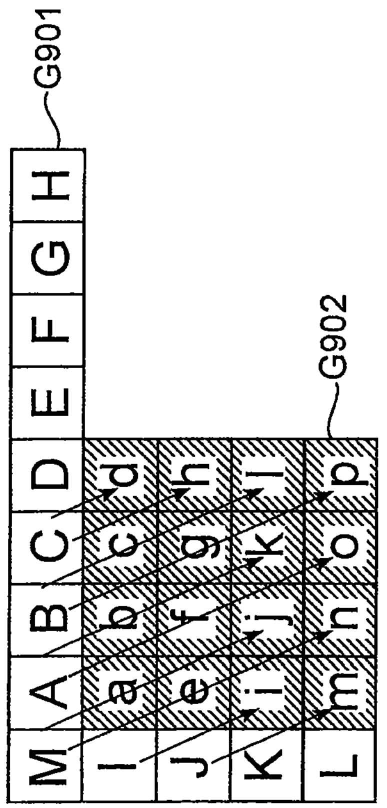
FIG. 9 is a schematic diagram for explaining a prediction method by the prediction signal generating unit shown in FIG. 2.
Figure 10:
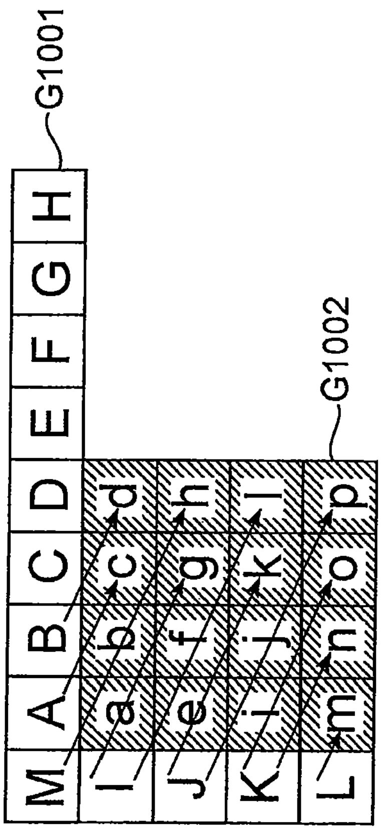
FIG. 10 is a schematic diagram for explaining a prediction method by the prediction signal generating unit shown in FIG. 2.
Figure 11:
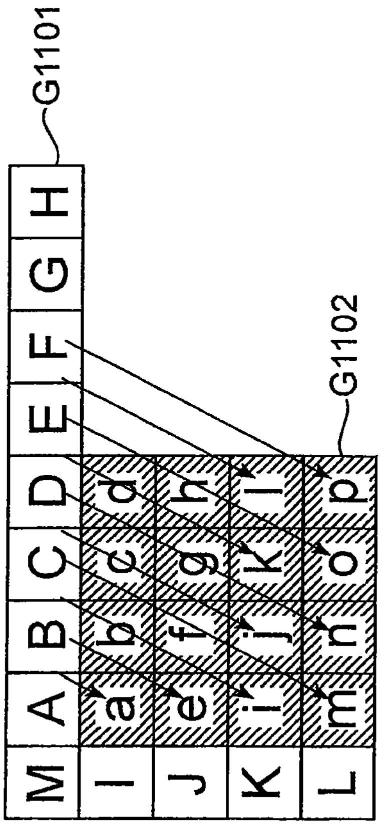
FIG. 11 is a schematic diagram for explaining a prediction method by the prediction signal generating unit shown in FIG. 2.
Figure 12:
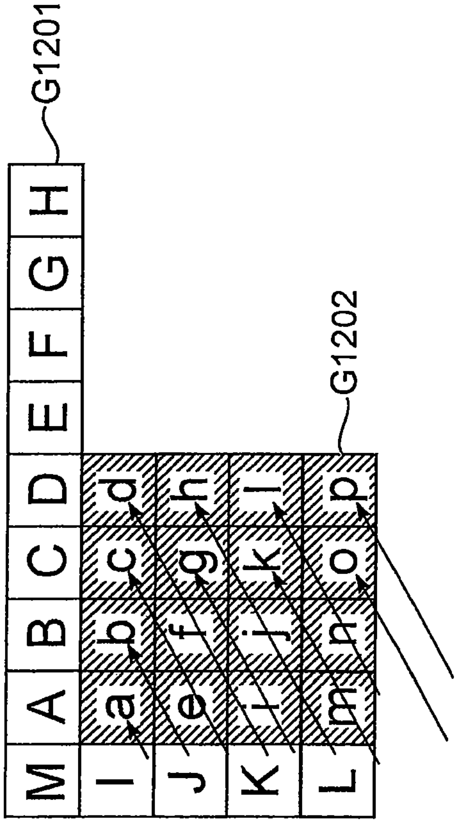
FIG. 12 is a schematic diagram for explaining a prediction method by the prediction signal generating unit shown in FIG. 2.
Figure 15:
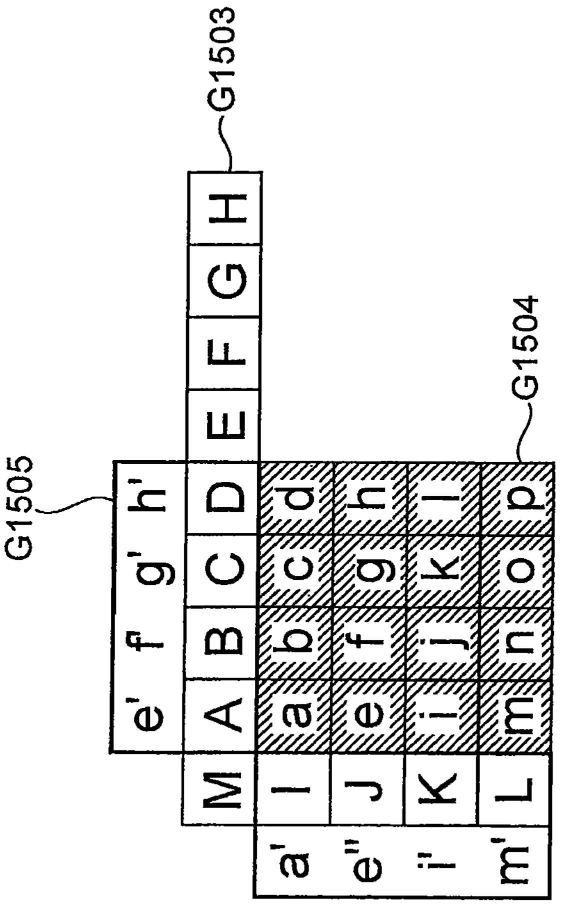
FIG. 15 is a schematic diagram for explaining a prediction method by the adjacent mode determining unit shown in FIG. 2.
Figure 16:
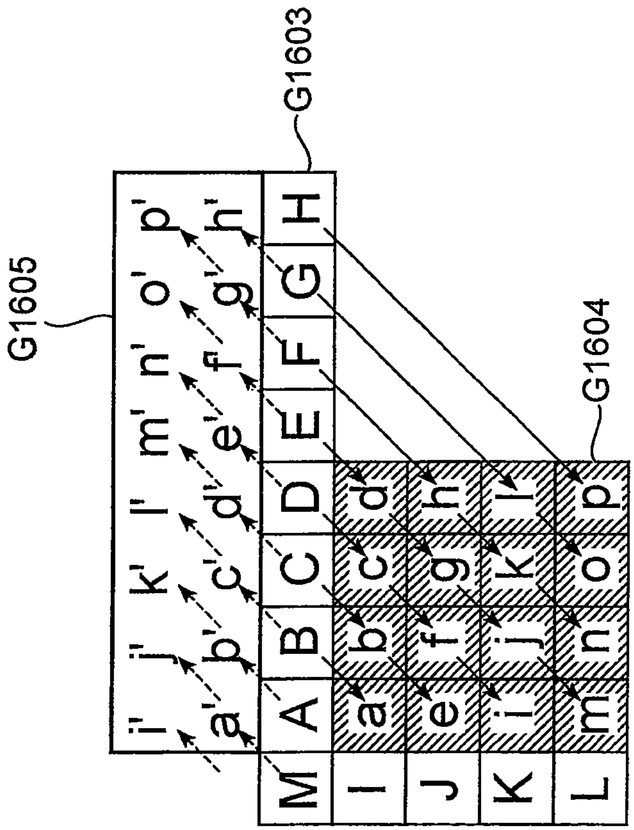
FIG. 16 is a schematic diagram for explaining a prediction method by the adjacent mode determining unit shown in FIG. 2.
Figure 17:
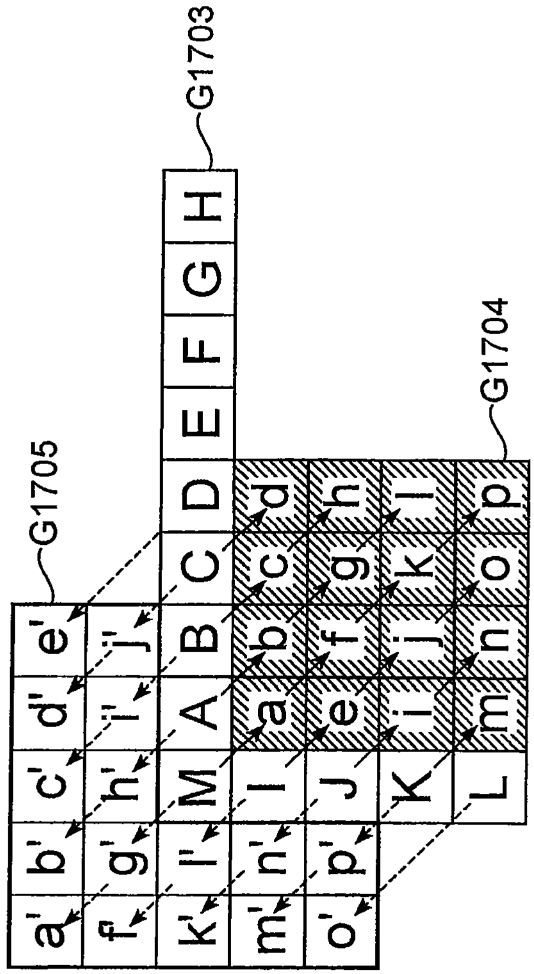
FIG. 17 is a schematic diagram for explaining a prediction method by the adjacent mode determining unit shown in FIG. 2.
Figure 18:
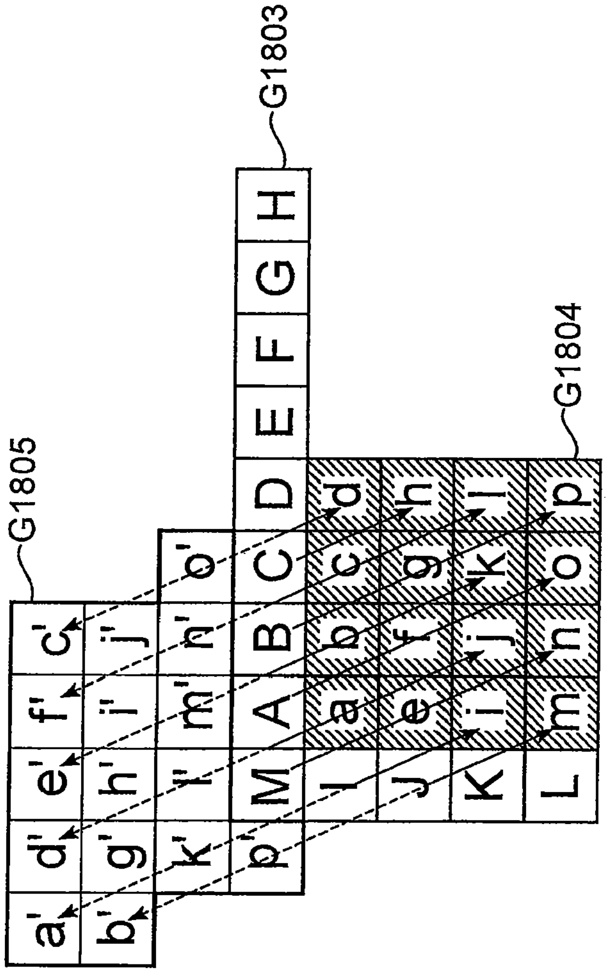
FIG. 18 is a schematic diagram for explaining a prediction method by the adjacent mode determining unit shown in FIG. 2.
Figure 19:
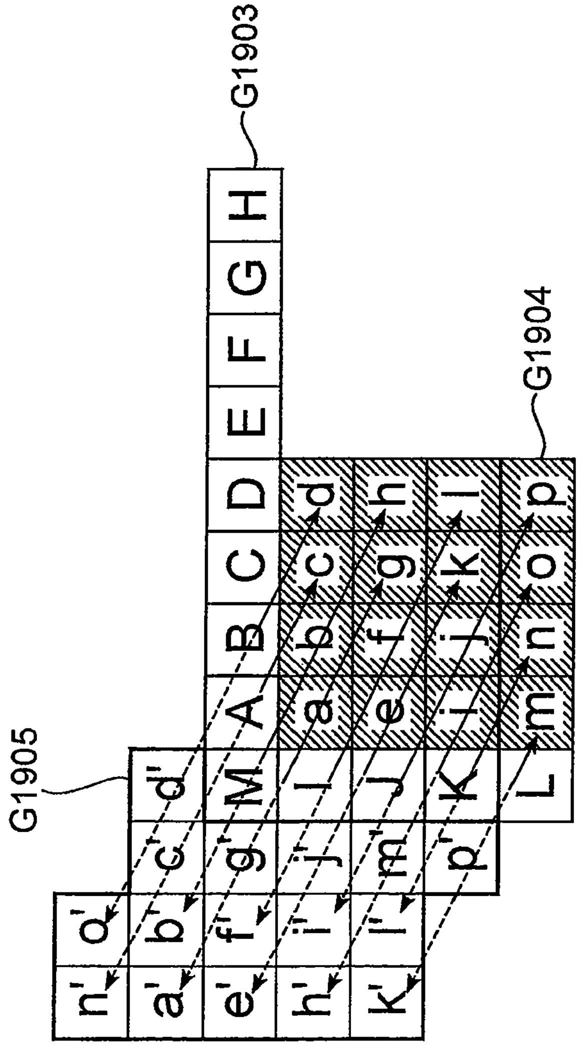
FIG. 19 is a schematic diagram for explaining a prediction method by the adjacent mode determining unit shown in FIG. 2.
Figure 20:
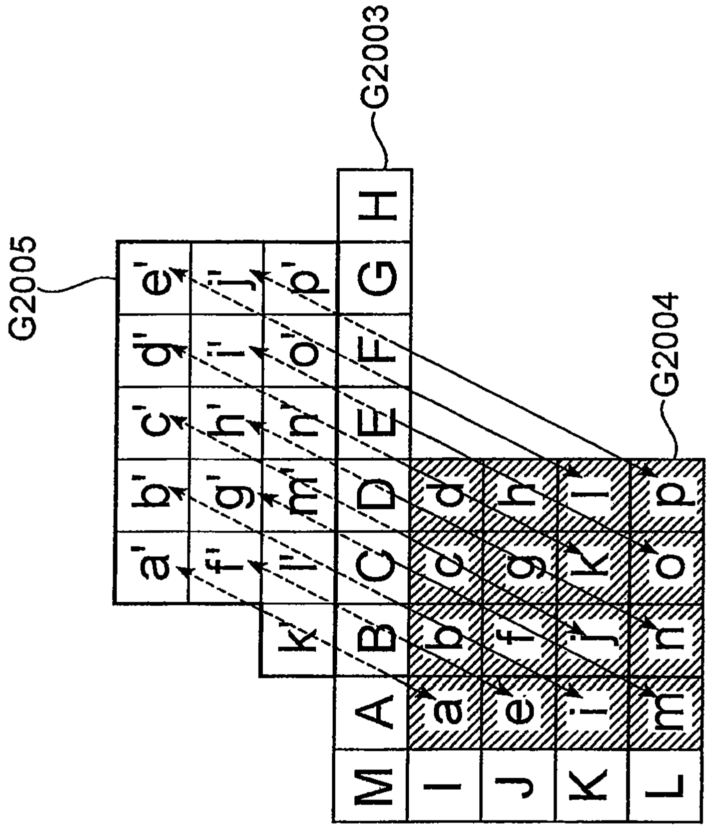
FIG. 20 is a schematic diagram for explaining a prediction method by the adjacent mode determining unit shown in FIG. 2.
Figure 21:
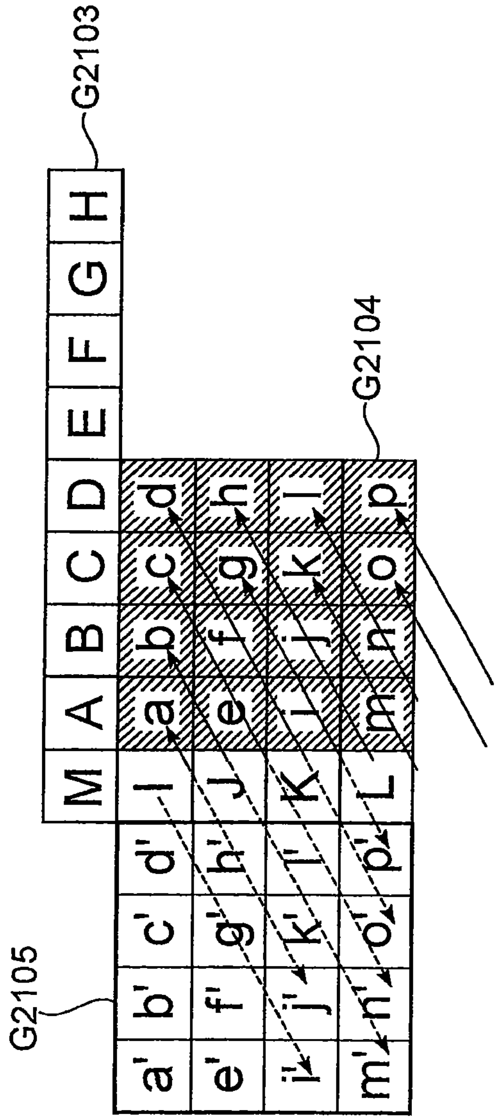
FIG. 21 is a schematic diagram for explaining a prediction method by the adjacent mode determining unit shown in FIG. 2.

It should be noted that the target block prediction methods shown in FIGS. 4 to 12 and the corresponding adjacent region prediction methods shown in FIGS. 13 to 21 have a certain relation. First, the interpolation signals are generated using the same proximate pixel group in two corresponding prediction methods. In addition, except for the cases using the average of the proximate pixel group as shown in FIGS. 6 and 15, there is a fixed relation between the direction of interpolation for the target pixel signals of the target block and the direction of interpolation for the pixel signals of the adjacent region, and, specifically, the directions are opposite to each other (it should be, however, noted that they may be in any other relation).

The shapes and positions of the adjacent region in the respective prediction methods are different because they are defined in accordance with the respective prediction methods, but it is also possible to use the adjacent region of the same shape and position regardless of the prediction methods. Furthermore, the number of pixels in the adjacent region is equal among the prediction methods and the adjacent region includes 4×4 pixels; however, the number of pixels in the adjacent region may be varied according to the prediction methods. In that case, it is, however, necessary to normalize the correlation values, for comparison thereof.

The mode information predicting unit 205 receives the input of the mode information about the target region prediction method (or its identification number) via the line L205 and the input of the mode information about the adjacent region prediction method (or its identification number) via the line L206. The mode information predicting unit 205 predicts the mode information of the target region prediction method, based on the mode information about the adjacent region prediction method. In the present embodiment, the mode information predicting unit 205 subtracts from the mode information of the target region prediction method the mode information about the adjacent region prediction method used as a prediction value thereof, and sends the difference between them as relative mode information via the line L125 to the entropy encoding unit 115 (cf. FIG. 1). It is noted herein that any method may be used for relatively encoding the mode information of the target region prediction method using the mode information about the adjacent region prediction method.

Figure 22:
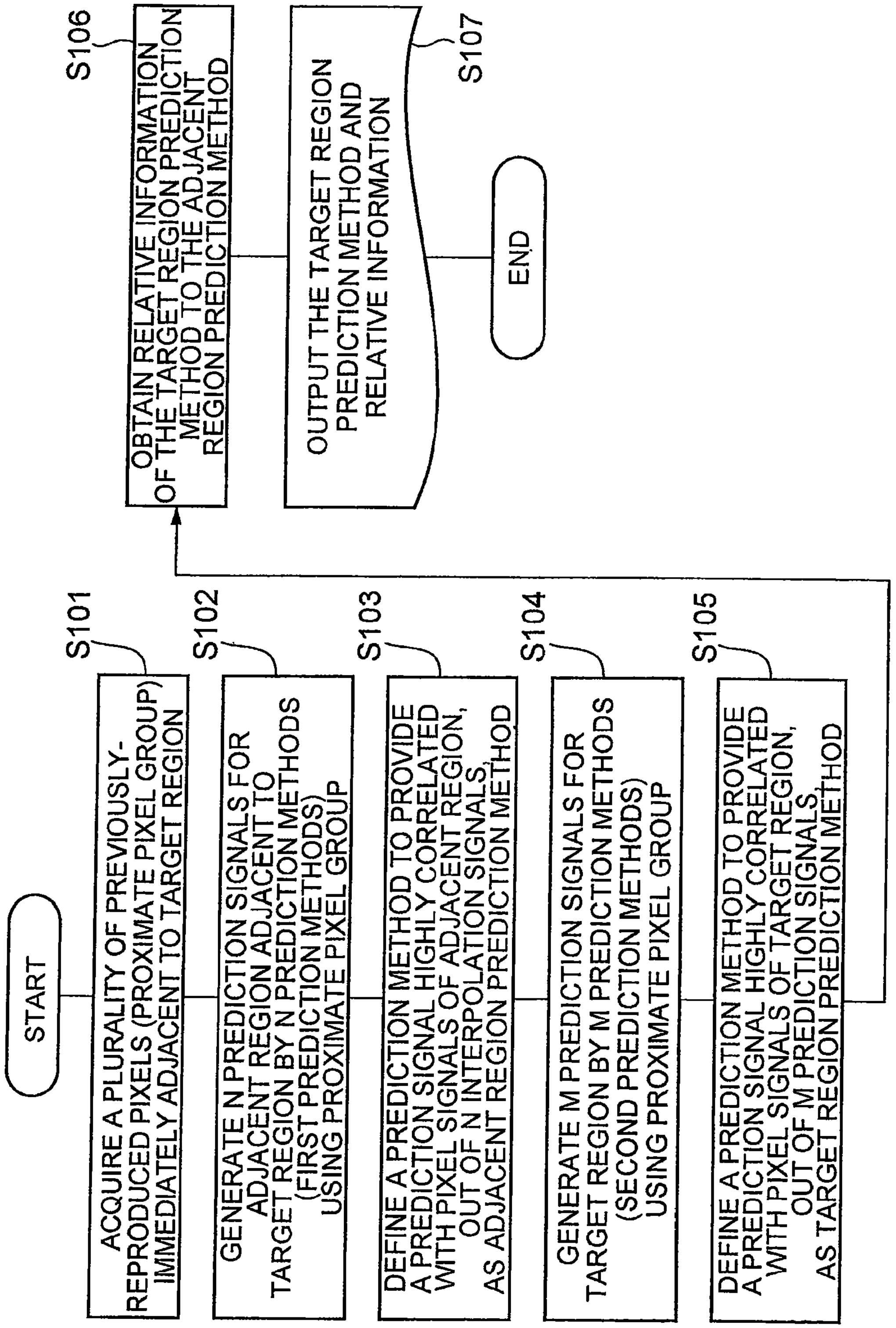
FIG. 22 is a flowchart showing an operation of the intra-frame prediction signal generation method determining unit shown in FIG. 2.

FIG. 22 is a flowchart showing the process of determining the intra-frame prediction method and the process of generating the mode information according to an embodiment of the present invention. First, the prediction signal generating unit 202 and the adjacent mode determining unit 206 acquire from the frame memory 114 the proximate pixel group being a plurality of previously-reproduced pixels immediately adjacent to the target block (step S101). Next, the adjacent mode determining unit 206 generates N prediction signals for the adjacent region adjacent to the target block, using the proximate pixel group (step S102). In the present embodiment, N=9, and the prediction signals for the adjacent region are generated according to the prediction methods shown in FIGS. 13 to 21. Then the adjacent mode determining unit 206 calculates differences between the generated prediction signals for the adjacent region and the pixel signals originally included in the adjacent region, defines the differences as correlation values corresponding to the respective prediction methods, and determines an adjacent region prediction method to provide the highest correlation with the adjacent region, out of them (step S103).

On the other hand, the prediction signal generating unit 202 generates M prediction signals for the target block, using the same proximate pixel group (step S104). In the present embodiment, M=9 and the prediction signals for the target block are generated by respective prediction methods according to the methods shown in FIGS. 4 to 12. Next, the prediction method determining unit 201 calculates differences between the prediction signals for the target block generated as described above and the pixel signals originally included in the target block, defines the differences as correlation values corresponding to the respective prediction methods, and determines a prediction method to provide the highest correlation with the target block, out of them (step S105). Namely, this prediction method is derived as a target region prediction method.

Then the mode information predicting unit 205 predicts the target region prediction method on the basis of the adjacent region prediction method and obtains the relative mode information between them (step S106). Namely, the relative mode information is calculated by subtracting a mode number indicating the adjacent region prediction method, from a mode number indicating the target region prediction method. Finally, the mode information predicting unit 205 outputs the foregoing relative mode information via the entropy encoding unit 115 (step S107). The above processing is repeatedly carried out for all or some of blocks in the image as a target of encoding.

(Image Prediction Decoding Device)

Figure 23:
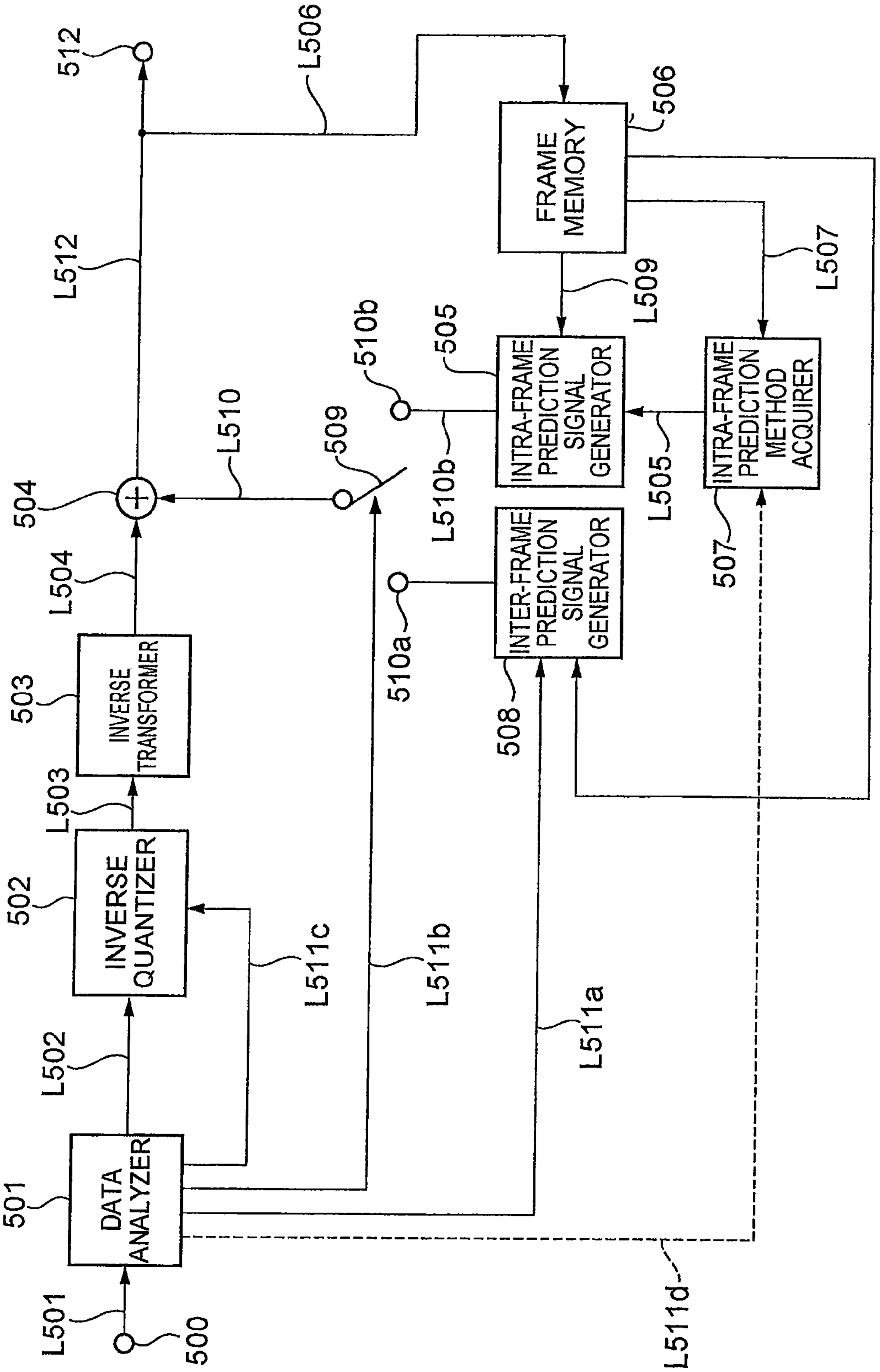
FIG. 23 is a block diagram showing a configuration of an image prediction decoding device according to a preferred embodiment of the present invention.

The below will describe a configuration of an image prediction decoding device according to the present embodiment. FIG. 23 is a block diagram showing the configuration of the image prediction decoding device 50 according to a preferred embodiment of the present invention. The image prediction decoding device 50 shown in the same drawing is constructed with an input terminal 500, a data analyzing unit (data analyzing means) 501, an inverse quantization unit (residual signal restoring means) 502, an inverse transform unit (residual signal restoring means) 503, an adder (image restoring means) 504, an intra-frame prediction signal generating unit (prediction signal generating means) 505, a frame memory 506, an intra-frame prediction method acquiring unit (prediction signal generating means) 507, an inter-frame prediction signal generating unit 508, a changeover switch 509, and an output terminal 512. Each of the components of the image prediction decoding device 50 will be described below.

The data analyzing unit 501 receives an input of compressed image data, which was compressively encoded, from the input terminal 500 and extracts from the compressed image data, a residual signal of a target block, the information about the prediction method, a quantization parameter, and motion information (in the case of inter-frame prediction). This compressed image data contains the residual signal resulting from predictive encoding of the object of the target block out of a plurality of blocks obtained by dividing an image of one frame, and the mode information about the prediction method. The data analyzing unit 501 outputs the extracted residual signal and quantization parameter via a line L502 and via a line L511*c* to the inverse quantization unit 502 and sends the information about the prediction method via a line L511*b* to the switch 509. Furthermore, the data analyzing unit 501 outputs the motion information for the target block as an object of restoring, via a line L511*a* to the inter-frame prediction signal generating unit 508 and sends the relative mode information included in the mode information, via a line L511*d* to the intra-frame prediction method acquiring unit 507.

The changeover switch 509 changes over a connected terminal of the adder 504, based on the mode information output from the data analyzing unit 501. Specifically, the changeover switch 509 changes the connection over to the terminal 510*a* side in the case of executing the inter-frame prediction and changes the connection over to the terminal 510*b* side in the case of executing the intra-frame prediction, based on the information about the prediction method.

The inverse quantization unit 502 performs inverse quantization of the residual signal of the target block, based on the quantization parameter. The inverse quantization unit 502 outputs the inversely quantized residual signal via a line L503 to the inverse transform unit 503.

The inverse transform unit 503 performs an inverse discrete cosine transform of the residual signal input from the inverse quantization unit 502, to restore a reproduced residual signal. The inverse transform unit 503 outputs the reproduced residual signal thus restored, via a line L504 to the adder 504.

When the inter-frame prediction is adopted, the inter-frame prediction signal generating unit 508 generates a prediction signal designated by a motion vector with reference to the frame memory 506. On the other hand, when the intra-frame prediction is adopted, the intra-frame prediction method acquiring unit 507 acquires a prediction method for restoring the target pixel signals of the target block, based on the relative mode information (the details will be described below). The acquired prediction method is sent via a line L505 to the intra-frame prediction signal generating unit 505 and the intra-frame prediction signal generating unit 505 acquires pixel signals in a proximate pixel group from the frame memory 506, based on the prediction method, and generates a prediction signal for the target pixel signals. Each of the inter-frame prediction signal generating unit 508 and the intra-frame prediction signal generating unit 505 sends the generated prediction signal via the changeover switch 509 to the adder 504.

The adder 504 adds the reproduced residual signal restored by the inverse transform unit 503, to the prediction signal to restore the pixel signals of the target block, outputs the pixel signals via a line L512 to the output terminal 512, and also stores them into the frame memory 506.

Figure 24:
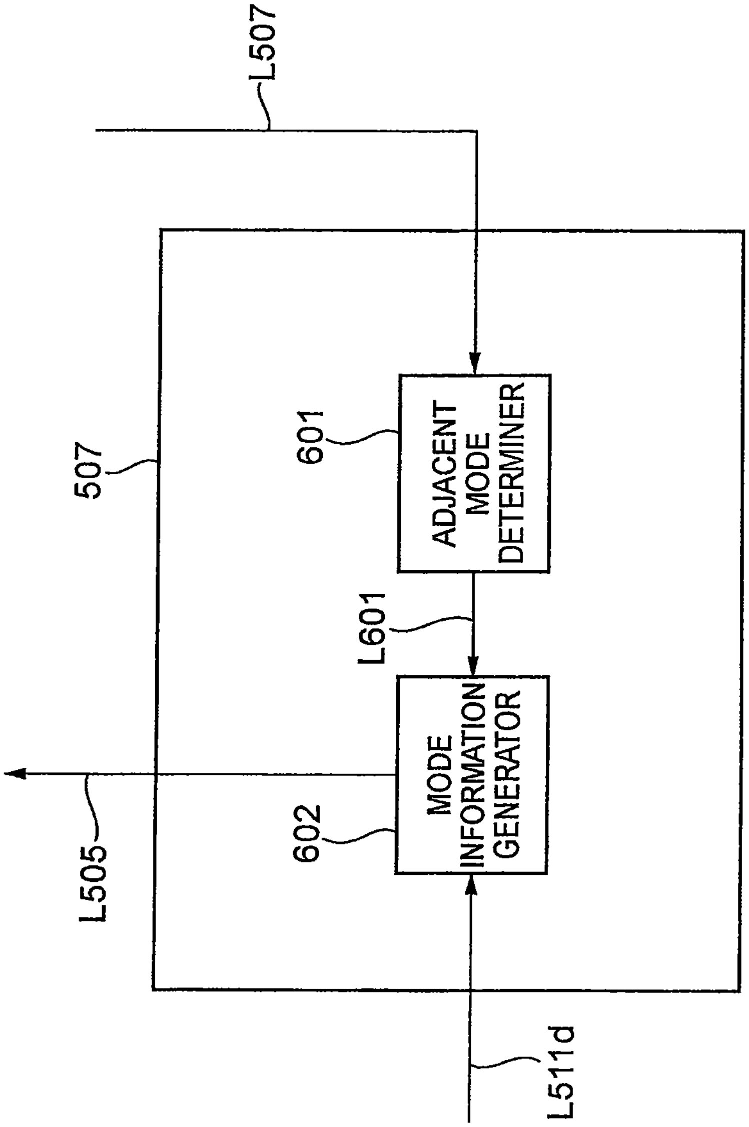
FIG. 24 is a block diagram showing a configuration of an intra-frame prediction method acquiring unit shown in FIG. 23.

The configuration of the intra-frame prediction method acquiring unit 507 will be described below in more detail. FIG. 24 is a block diagram showing the configuration of the intra-frame prediction method acquiring unit 507. As shown in the same drawing, the intra-frame prediction method acquiring unit 507 has an adjacent mode determining unit 601 (first prediction method determining unit) and a mode information generating unit 602.

The adjacent mode determining unit 601 determines an optimum prediction method for an adjacent region adjacent to the target block, using the proximate pixel group, and the mode information generating unit 602 restores a relative value of the mode information about the intra-frame prediction method sent via the line L511*d*, using the optimum prediction method (adjacent region prediction method), and outputs the obtained mode information about the intra-frame prediction method via the line L505 to the intra-frame prediction signal generating unit 505.

The adjacent mode determining unit 601 acquires the pixel values of the adjacent region and the pixel values of the proximate pixel group via the line L507 from the frame memory 506 and generates respective prediction signals for the adjacent region, using the nine prediction methods of FIGS. 13 to 21 described above. At this time, the adjacent mode determining unit 601 generates the prediction signals for the adjacent region, using at least a part of the proximate pixel group, and determines differences between the generated prediction signals and the pixel signals that the adjacent region originally has, as correlation values between the prediction signals and the pixel signals of the adjacent region. In the present embodiment, the correlation values to be used are sums of absolute difference signals. Then the adjacent mode determining unit 601 derives a prediction method with the highest correlation out of the nine correlation values determined as described above, as an adjacent region prediction method and sends the adjacent region prediction method via a line L601 to the mode information generating unit 602.

The mode information generating unit 602 predicts the target region prediction method for the target block, based on the adjacent region prediction method derived by the adjacent mode determining unit 601. Specifically, the mode information generating unit 602 adds an identification number of the adjacent region prediction method to the relative value of the mode information about the intra-frame prediction method sent via the line L511*d*, to generate the mode information about the intra-frame prediction method. Instead of the addition, the operation method used herein for deriving the mode information about the target block may be the operation method corresponding to the encoding device to restore the mode information about the intra-frame prediction method on the basis of the adjacent region prediction method.

Figure 25:
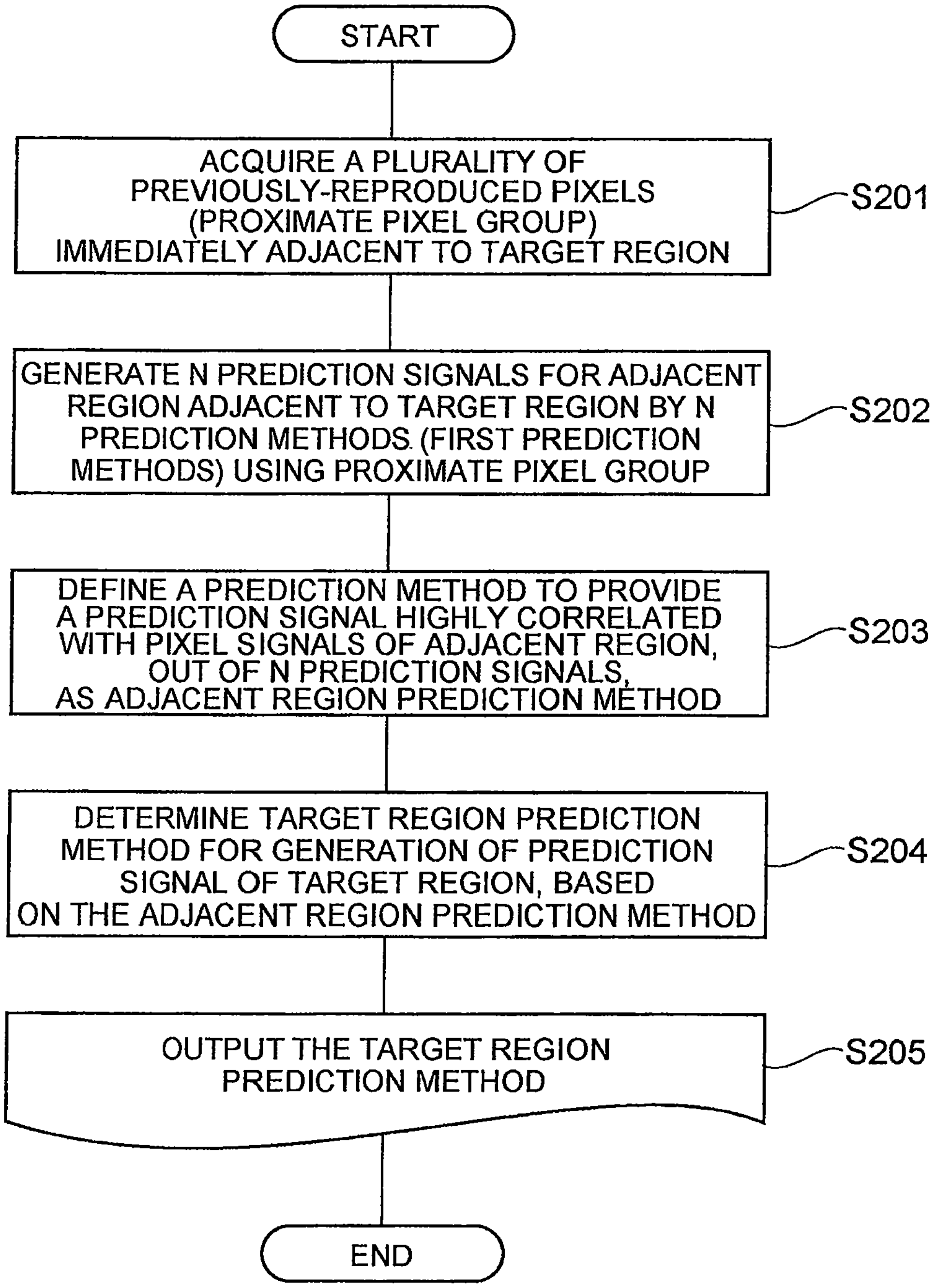
FIG. 25 is a flowchart showing an operation of the intra-frame prediction method acquiring unit shown in FIG. 24.

FIG. 25 is a flowchart showing the process of determining the intra-frame prediction method according to an embodiment of the present invention. First, the adjacent mode determining unit 601 acquires from the frame memory 506 a plurality of previously-reproduced pixels (proximate pixel group) immediately adjacent to the target block (step S201). Next, the adjacent mode determining unit 601 generates N prediction signals for the adjacent region adjacent to the target block, using the proximate pixel group (step S202). In the present embodiment, N=9 and the prediction signals for the adjacent region are generated by respective prediction methods according to the methods shown in FIGS. 13 to 21.

Then the adjacent mode determining unit 601 obtains differences between the generated prediction signals for the adjacent region and the pixel signals originally included in the adjacent region, as correlation values corresponding to the respective prediction methods and determines an adjacent region prediction method to provide the highest correlation with the adjacent region, out of them (step S203). Thereafter, the mode information generating unit 602 derives a target region prediction method for generation of the prediction signal for the target block, based on the relative mode information about the intra-frame prediction method belonging to the target block, and the adjacent region prediction method (step S204). In the present embodiment, the target region prediction method is derived by adding the identification number of the adjacent region prediction method to the aforementioned relative mode information. Finally, the identification information about the target region prediction method is output to the intra-frame prediction signal generating unit 505 (step S205). The subsequent process is to generate the prediction signal of the target block according to this identification information.

The image prediction encoding device 10 and the image prediction decoding device 50 described above are configured to derive the adjacent region prediction method for generation of the prediction signal highly correlated with the pixel signals of the adjacent region, using the proximate pixel group being the previously-reproduced pixel signals immediately adjacent to the target region as an encoding object, out of the first prediction methods for prediction of the pixel signals of the adjacent region, to predict the target region prediction method on the basis of the adjacent region prediction method, and to generate the intra-frame prediction signal of the target region on the basis of the target region prediction method. This configuration reduces the code amount related to the identification information (mode information) for identification of the target region prediction method and thus efficiently depresses the mode information for identification of the prediction method. As a result, the mode information for identification of the prediction method is reduced even if there are a lot of modes provided as to the methods of generation of intra-frame prediction signals in the pixel domain in order to improve the prediction accuracy of pixel signals, and the total encoding efficiency is improved thereby. Particularly, since the prediction method determined for the adjacent region with reference to the proximate pixel group is highly correlated with the prediction method about the target region determined using the same proximate pixel group, the prediction accuracy of mode information is improved and the total code amount is more efficiently reduced.

Furthermore, as the mode information can be reduced in the compressed data, the mode information will be less increased with increase in the number of blocks even if the target region is divided into smaller blocks; therefore, the target region can be divided into smaller areas and this permits interpolation signals to be made so as to match local properties of smaller blocks, thus achieving an effect of reducing the residual signal.

Moreover, in the case where a region adjacent to the target block is encoded by inter-frame prediction encoding and where the adjacent block has no intra-frame prediction information, the prediction information of the target region is encoded based on a prediction method determined from a plurality of prediction methods for the adjacent region to the target block, and therefore the information about the prediction method in the target block is efficiently encoded.

Particularly, the target region prediction method for generation of the prediction signal highly correlated with the pixel signals of the target region is derived using the proximate pixel group out of the second prediction methods for prediction of the pixel signals of the target region, the target region prediction method is predicted based on the adjacent region prediction method, and the mode information about the target region prediction method is generated as relative information to the adjacent region prediction method. This configuration reduces the code amount of the mode information for identification of the target region prediction method by making use of the information predicted based on the adjacent region prediction method, and therefore the mode information for identification of the prediction method is efficiently depressed.

Furthermore, since the first prediction methods for prediction of pixel signals of the adjacent region and the second prediction methods for prediction of the target pixel signals have the relation in which the directions of interpolation for the pixel signals in the image signal are opposite to each other, the correlation becomes high between the derived adjacent region prediction method and the target region prediction method, whereby the mode information for identification of the prediction method is more efficiently depressed.

The below will describe an image prediction encoding program and an image prediction decoding program for letting a computer operate as the image prediction encoding device 10 and the image prediction decoding device 50.

The image prediction encoding program and the image prediction decoding program according to the present invention are provided as stored in a recording medium. Examples of such recording media include recording media such as floppy (registered trademark) disks, CD-ROM, DVD, or ROM, semiconductor memories, and so on.

Figure 26:
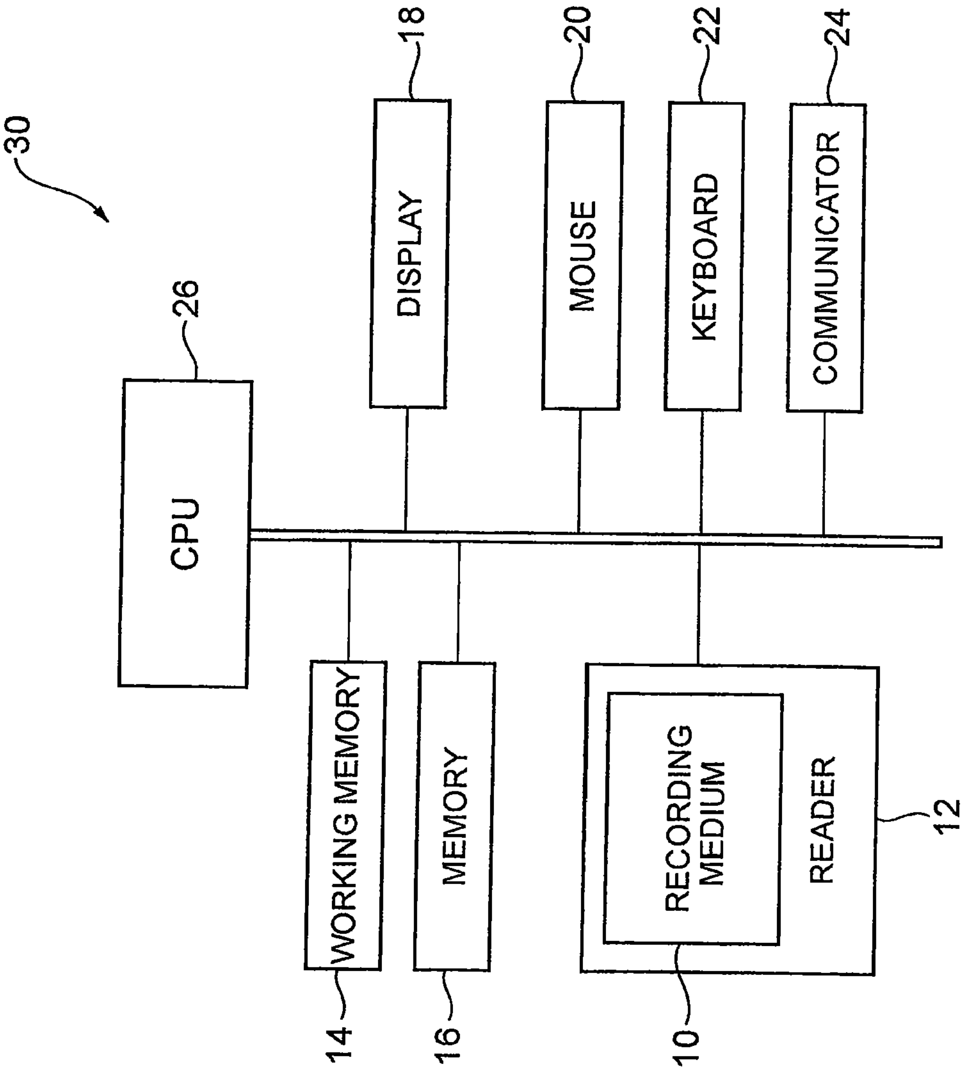
FIG. 26 is a drawing showing a hardware configuration of a computer for executing a program recorded in a recording medium.
Figure 27:
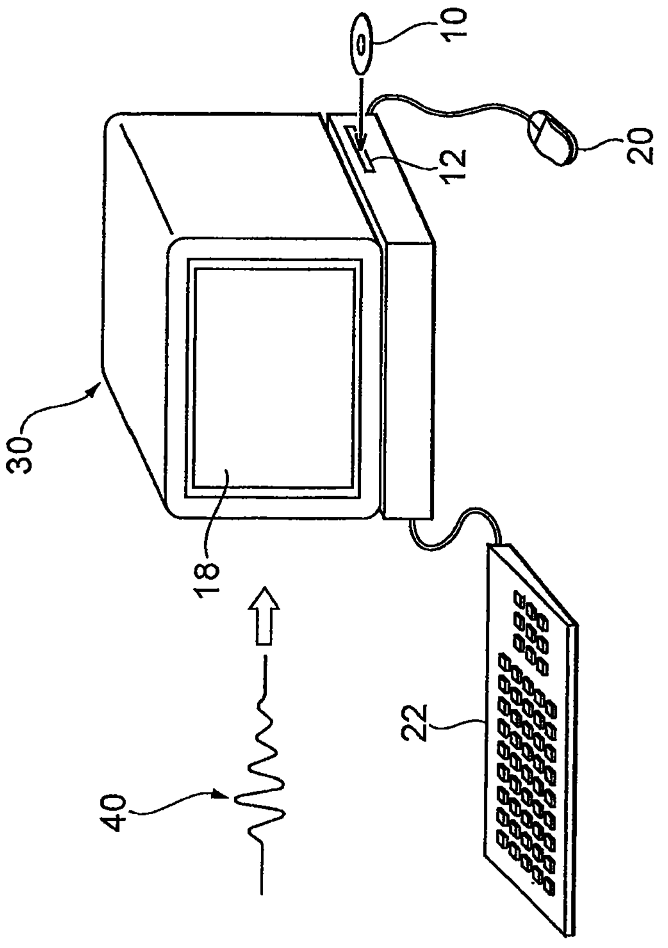
FIG. 27 is a perspective view of a computer for executing a program recorded in a recording medium.

FIG. 26 is a drawing showing a hardware configuration of a computer for executing a program recorded in a recording medium and FIG. 27 is a perspective view of a computer for executing a program stored in a recording medium. The term "computer" embraces a DVD player, a set-top box, a cell phone, or the like provided with a CPU and configured to perform processing and control based on software.

As shown in FIG. 26, the computer 30 has a reading device 12 such as a floppy (registered trademark) disk drive unit, a CD-ROM drive unit, or a DVD drive unit, a working memory (RAM) 14 on which an operating system is resident, a memory 16 storing a program recorded in the recording medium 10, a monitor device 18 like a display, a mouse 20 and a keyboard 22 as input devices, a communication device 24 for transmission and reception of data and the like, and a CPU 26 for controlling execution of the program. When the recording medium 10 is inserted into the reading device 12, the computer 30 becomes accessible to the image prediction encoding and decoding programs stored in the recording medium 10 and becomes able to operate as the image prediction encoding device and the image prediction decoding device according to the present invention, based on the image prediction encoding and decoding programs.

As shown in FIG. 27, the image prediction encoding program or the image prediction decoding program may be one provided through a network in the form of a computer data signal 40 superimposed on a carrier wave. In this case, the computer 30 stores the image prediction encoding program or the image prediction decoding program received by the communication device 24, into the memory 16 and then becomes able to execute the image prediction encoding program or the image prediction decoding program.

The present invention is not limited to the aforementioned embodiments. For example, the image prediction encoding device 10 and the image prediction decoding device 50 may be configured to operate so as to determine the prediction method of the target block, based on the adjacent region prediction method derived for the adjacent region using the proximate pixel group.

Figure 28:
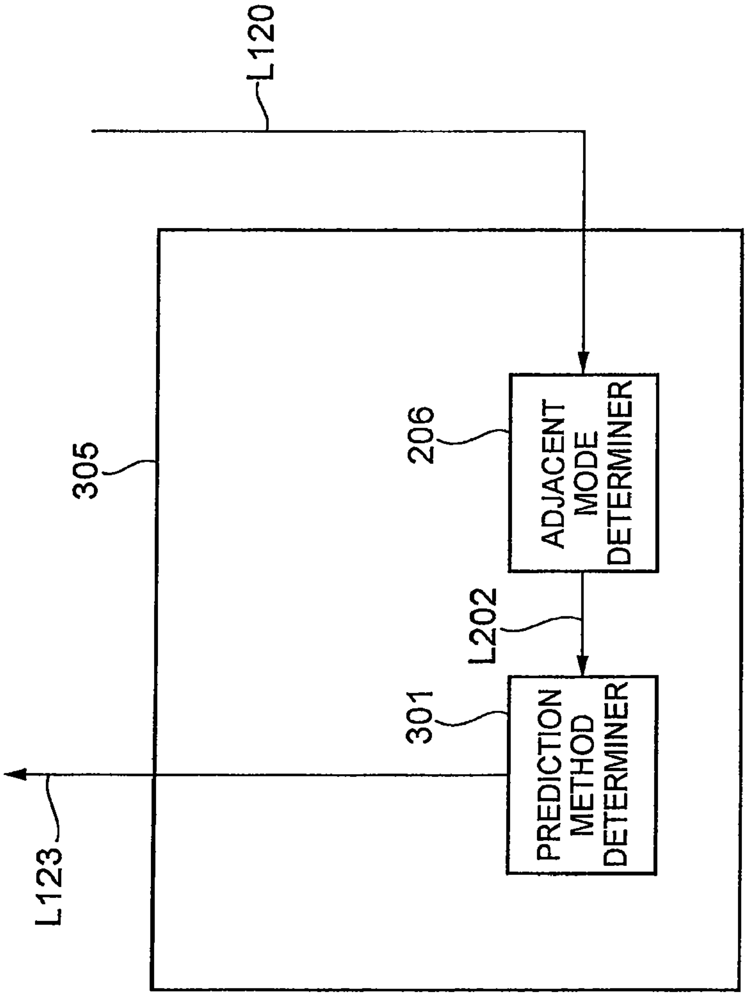
FIG. 28 is a block diagram showing a configuration of a modification example of the intra-frame prediction signal generation method determining unit shown in FIG. 1.

FIG. 28 is a block diagram showing a modification example of the intra-frame prediction signal generation method determining unit in the image prediction encoding device 10 in such a case. The intra-frame prediction signal generation method determining unit 305 being the modification example of the intra-frame prediction signal generation method determining unit 105 has the adjacent mode determining unit 206 and a prediction method determining unit 301. The adjacent mode determining unit 206 sends the information about the adjacent region prediction method being the optimum prediction method for the adjacent region, via the line L202 to the prediction method determining unit 301. The prediction method determining unit 301 predicts an optimum target region prediction method for the target block according to the adjacent region prediction method. Specifically, the prediction method determining unit 301 derives as the target region prediction method a prediction mode corresponding to the adjacent region prediction method because there is the fixed relation between the prediction methods of the target block and the corresponding adjacent region prediction methods, as described with reference to FIGS. 4 to 21. More particularly, a prediction mode for the target region is determined to be a prediction mode whose interpolation direction of pixel signals is opposite to that of the prediction mode of the adjacent region. For example, in the case where the adjacent region prediction method is to upwardly extend the proximate pixel group (FIG. 13), the method of downwardly extending the proximate pixel group is to be derived as the target region prediction method (FIG. 4). For example, the prediction method can be readily derived by assigning the same identification number to the prediction method of the target block and the corresponding prediction method of the adjacent region. Furthermore, the target region prediction method can also be derived by performing a predetermined operation on the identification number of the adjacent region prediction method.

Figure 29:
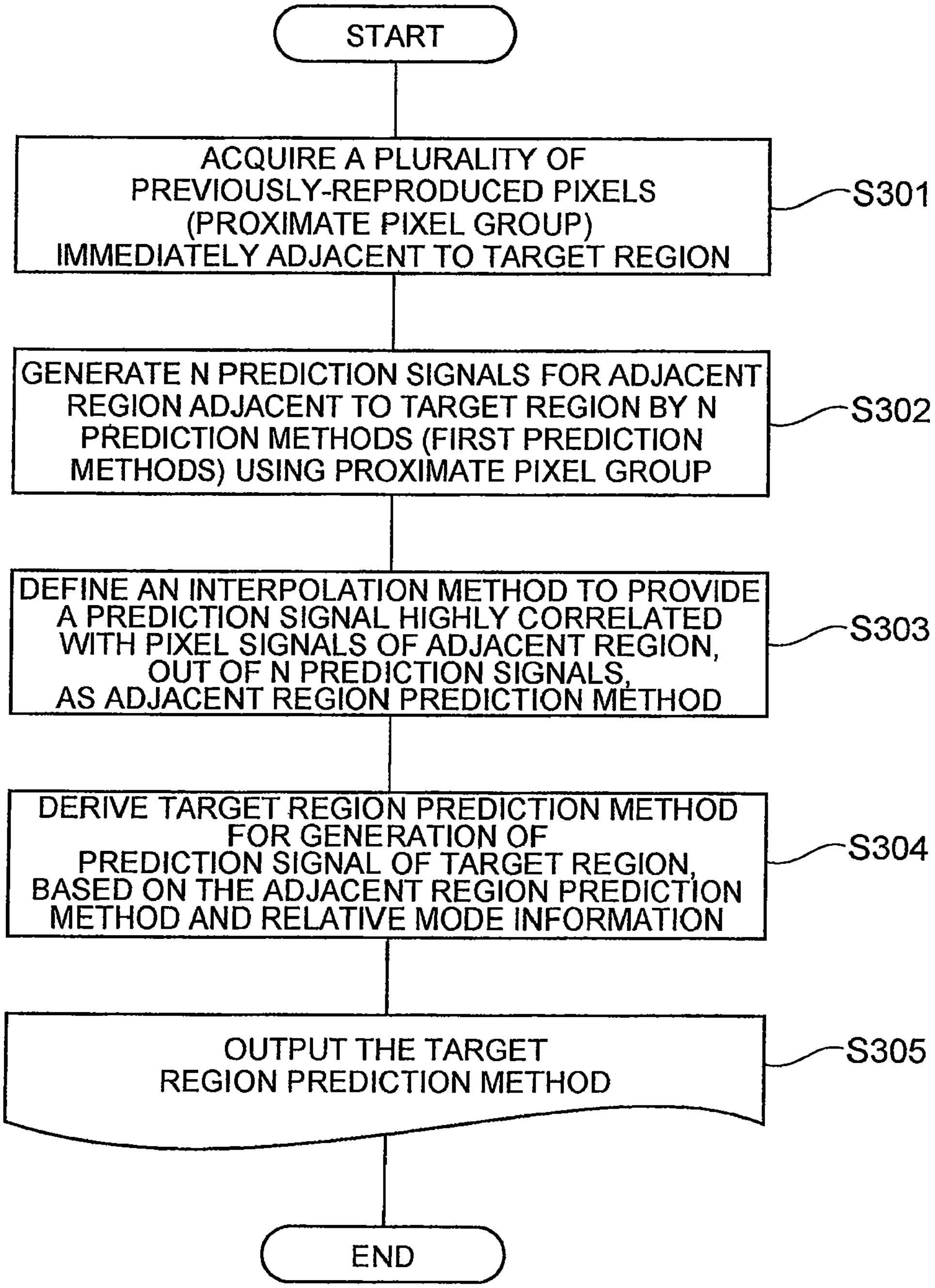
FIG. 29 is a flowchart showing an operation of the intra-frame prediction signal generation method determining unit shown in FIG. 28.

FIG. 29 is a flowchart showing the process of determining the prediction method by the intra-frame prediction signal generation method determining unit 305. First, the adjacent mode determining unit 206 acquires from the frame memory 506 a plurality of previously-reproduced pixels immediately adjacent to the target block (step S301). Next, the adjacent mode determining unit 206 generates N prediction signals for the adjacent region adjacent to the target block, using the proximate pixel group (step S302). In this example, N=9 and the prediction signals for the adjacent region are generated by respective prediction methods according to the methods shown in FIGS. 13 to 21. Then the adjacent mode determining unit 206 obtains differences between the prediction signals of the adjacent region and the pixel signals originally included in the adjacent region, as correlation values corresponding to the respective prediction methods, and determines a prediction method to provide the highest correlation with the adjacent region, out of the prediction methods, as an adjacent region prediction method (step S303). Thereafter, the prediction method determining unit 301 derives a target region prediction method according to the adjacent region prediction method, using the relation between the prediction methods of the target block and the corresponding prediction methods of the adjacent region (step S304). The details are as described above. Finally, the identification information about the target region prediction method is output to the intra-frame prediction signal generating unit 106 (step S305). The subsequent process is to generate the prediction signal of the target block according to this identification information.

When the device operates so as to determine the prediction method of the target block on the basis of the adjacent region prediction method as described above, there is no need for use of the mode information for identification of the target region prediction method and the total encoding efficiency is more improved. Since the prediction method appropriate as the target region prediction method is accurately derived by defining as the prediction method for the target region the prediction method in the relation of the opposite interpolation direction of pixel signals to the adjacent region prediction method, the code amount of the pixel signals is also effectively reduced.

The below will describe a configuration of the image prediction decoding device 50 corresponding to the above-described modification example. The image prediction decoding device 50 operates so as to determine the target region prediction method on the basis of only the adjacent region prediction method if the compressed data contains no mode information about the intra-frame prediction method. Namely, the relative mode information about the prediction method is not input into the intra-frame prediction method acquiring unit 507 in this case. The adjacent mode determining unit 601 sends the identification information about the determined adjacent region prediction method via the line L601 to the mode information generating unit 602. Then the mode information generating unit 602 derives the target region prediction method according to the adjacent region prediction method by making use of the fixed relation between the prediction methods of the target block and the corresponding prediction methods of the adjacent region as the prediction method determining unit 301 does. Specifically, the target region prediction method to be derived is a prediction method whose interpolation direction of pixel signals is opposite to that of the adjacent region prediction method.

The device may be configured to set the same shape and position (region) of the adjacent region for the target region in the nine prediction methods executed by the adjacent mode determining unit 206, 601 in FIG. 2, FIG. 24, or FIG. 28, to generate the prediction signals for the adjacent region of the same area by the nine prediction methods, and to determine the adjacent region prediction method, based on correlations between the generated signals and the pixel signals that the adjacent region originally has.

Figure 30:
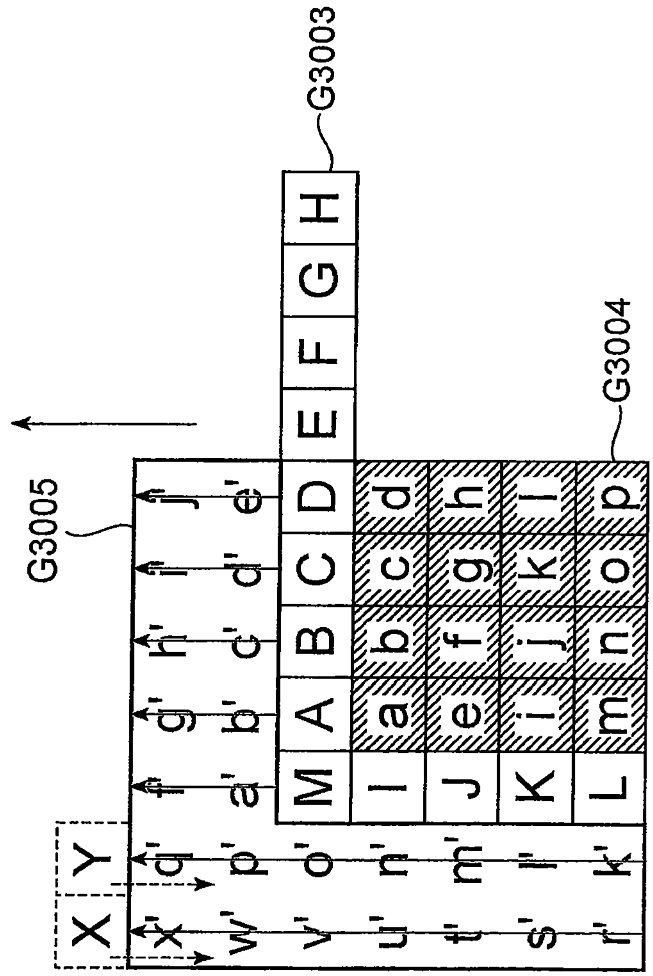
FIG. 30 is a schematic diagram for explaining a prediction method by the adjacent mode determining unit in the modification example of the present invention.
Figure 31:
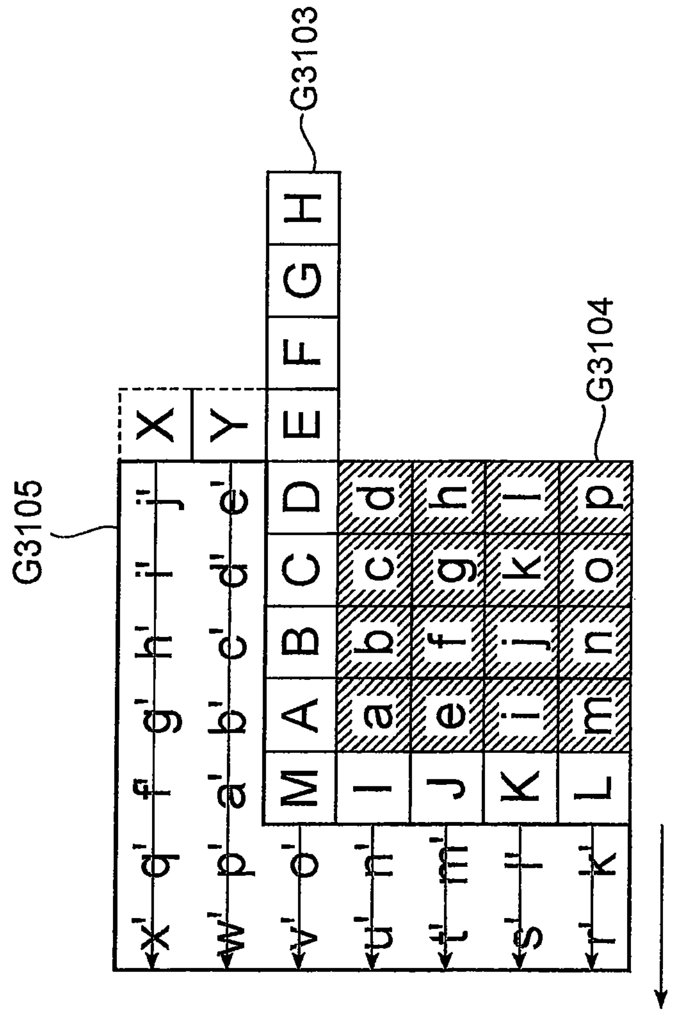
FIG. 31 is a schematic diagram for explaining a prediction method by the adjacent mode determining unit in the modification example of the present invention.
Figure 32:
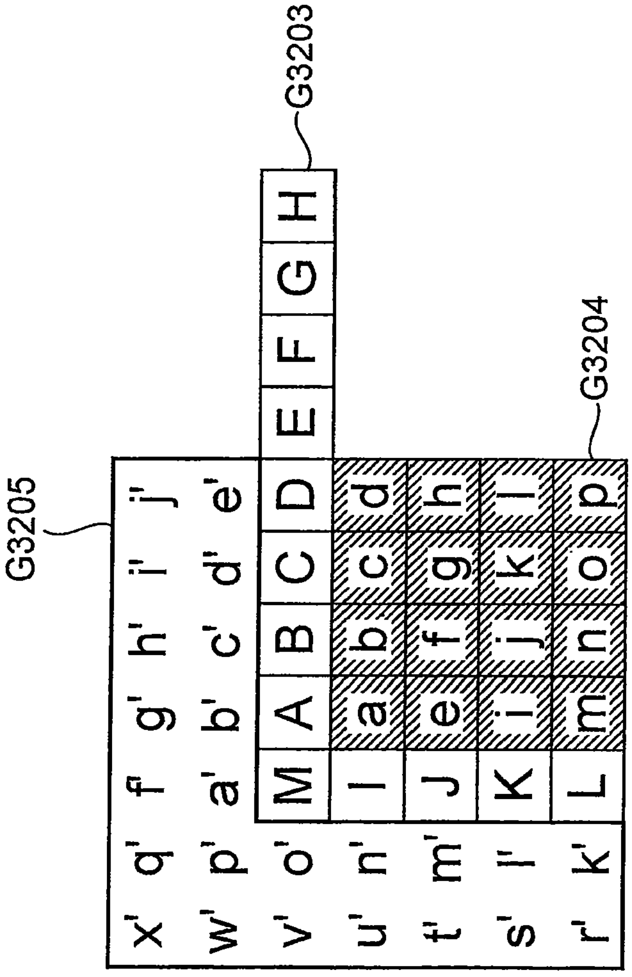
FIG. 32 is a schematic diagram for explaining a prediction method by the adjacent mode determining unit in the modification example of the present invention.
Figure 33:
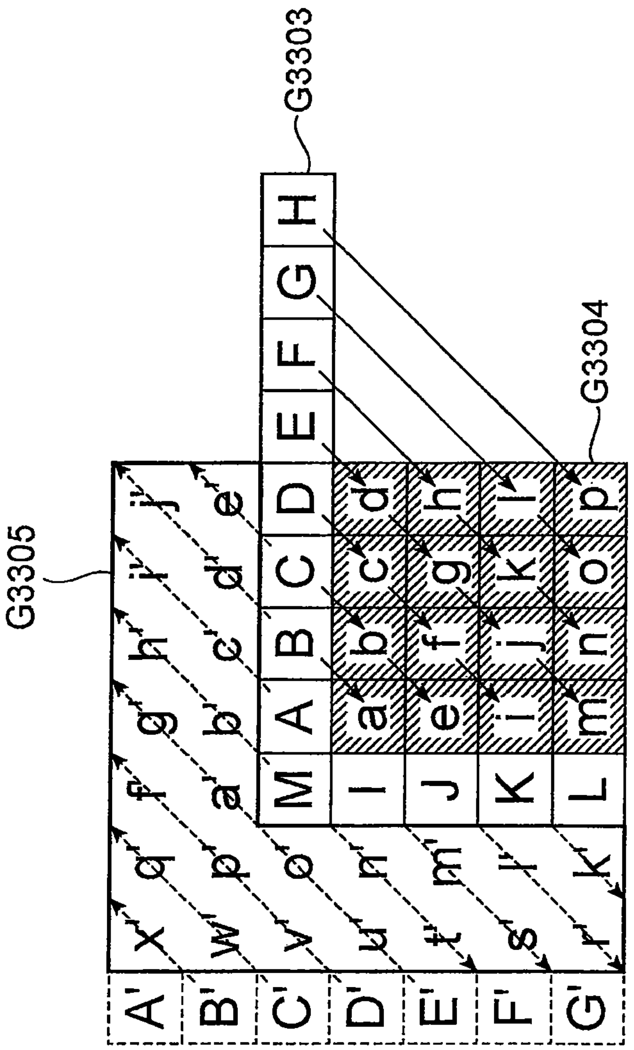
FIG. 33 is a schematic diagram for explaining a prediction method by the adjacent mode determining unit in the modification example of the present invention.
Figure 34:
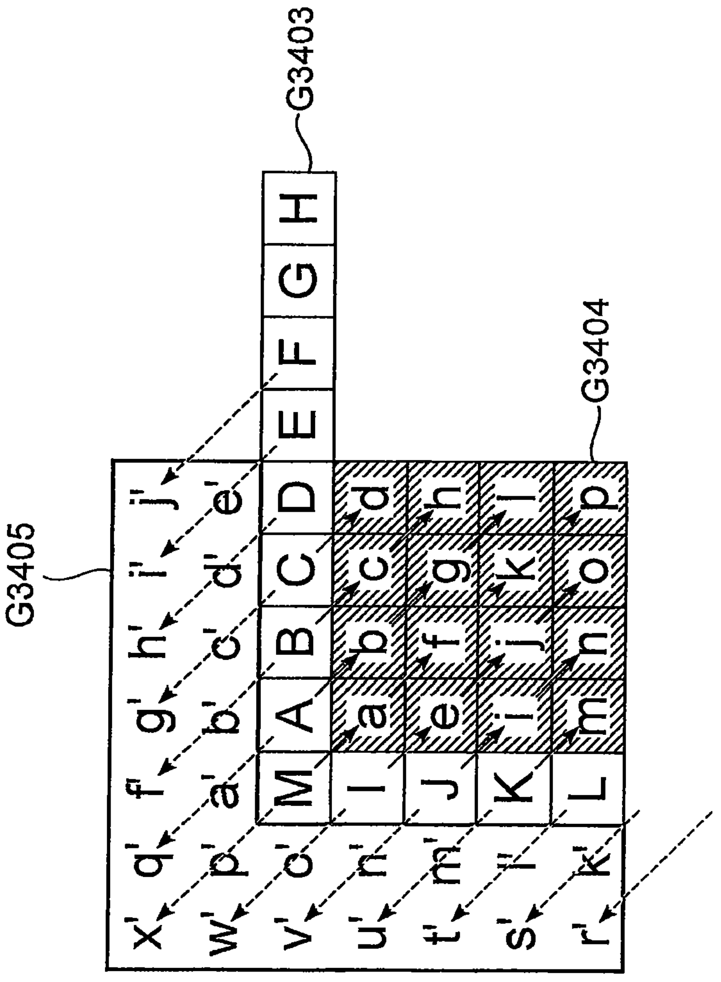
FIG. 34 is a schematic diagram for explaining a prediction method by the adjacent mode determining unit in the modification example of the present invention.
Figure 35:
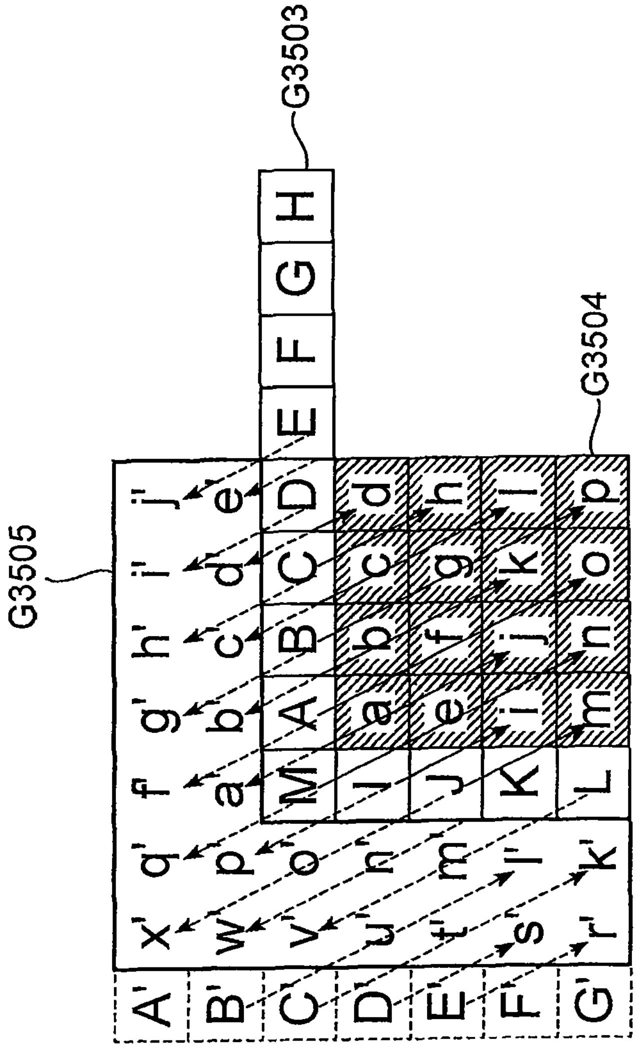
FIG. 35 is a schematic diagram for explaining a prediction method by the adjacent mode determining unit in the modification example of the present invention.
Figure 36:
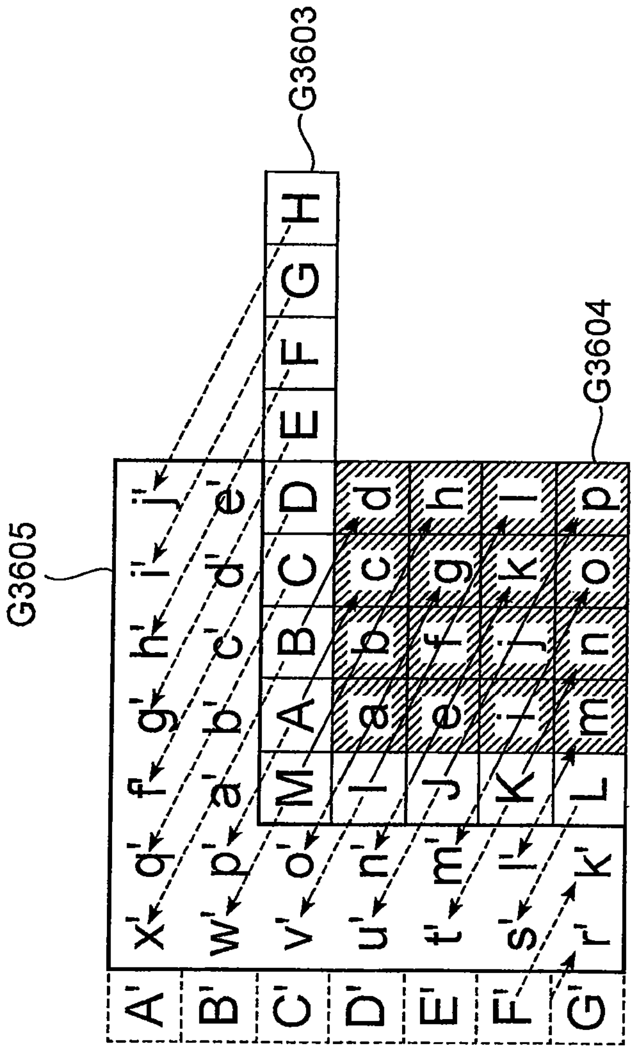
FIG. 36 is a schematic diagram for explaining a prediction method by the adjacent mode determining unit in the modification example of the present invention.
Figure 37:
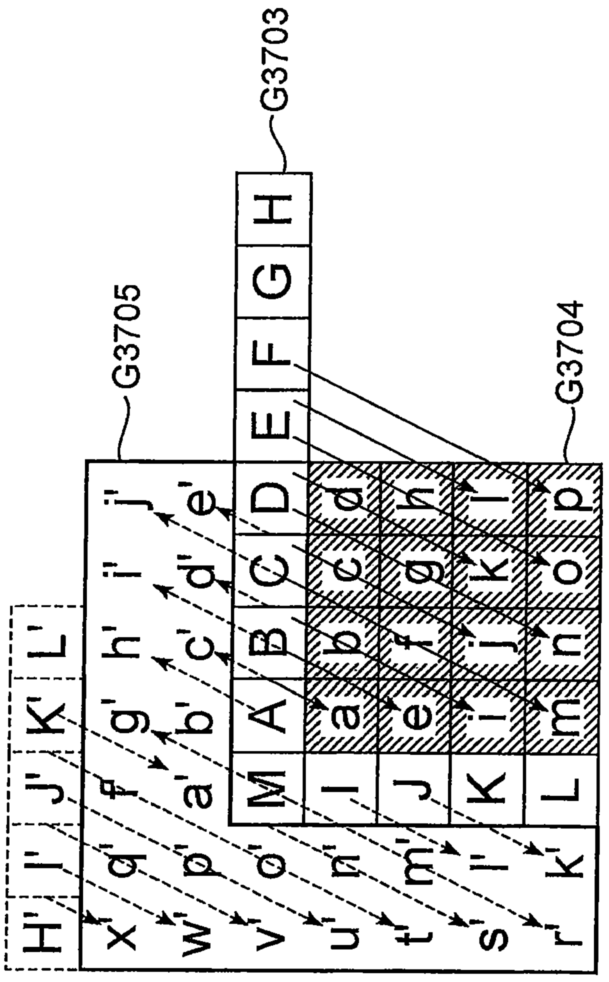
FIG. 37 is a schematic diagram for explaining a prediction method by the adjacent mode determining unit in the modification example of the present invention.
Figure 38:
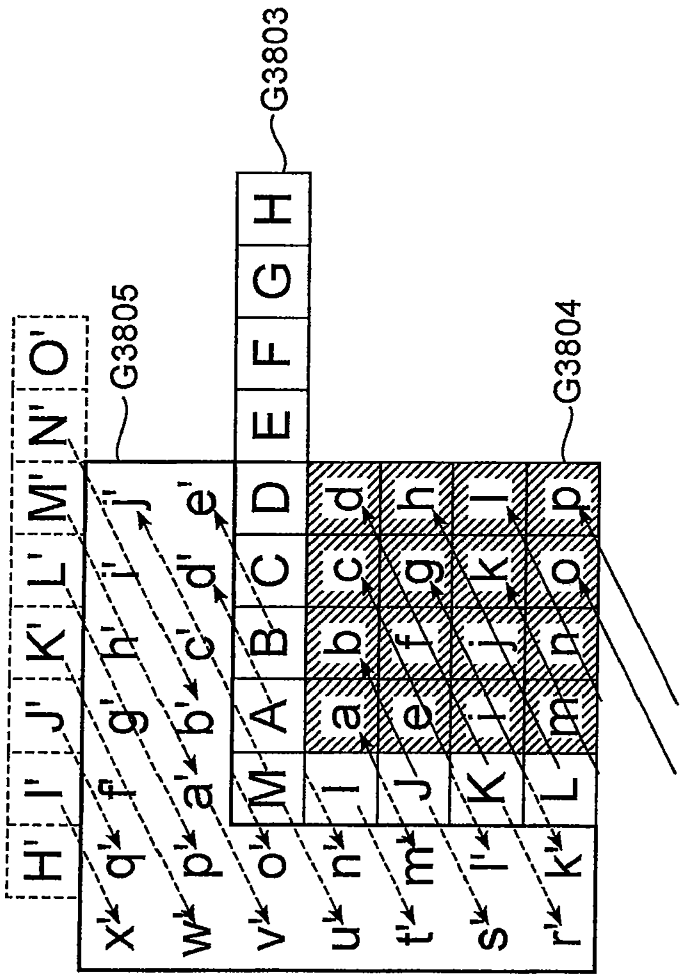
FIG. 38 is a schematic diagram for explaining a prediction method by the adjacent mode determining unit in the modification example of the present invention.
Figure 39:
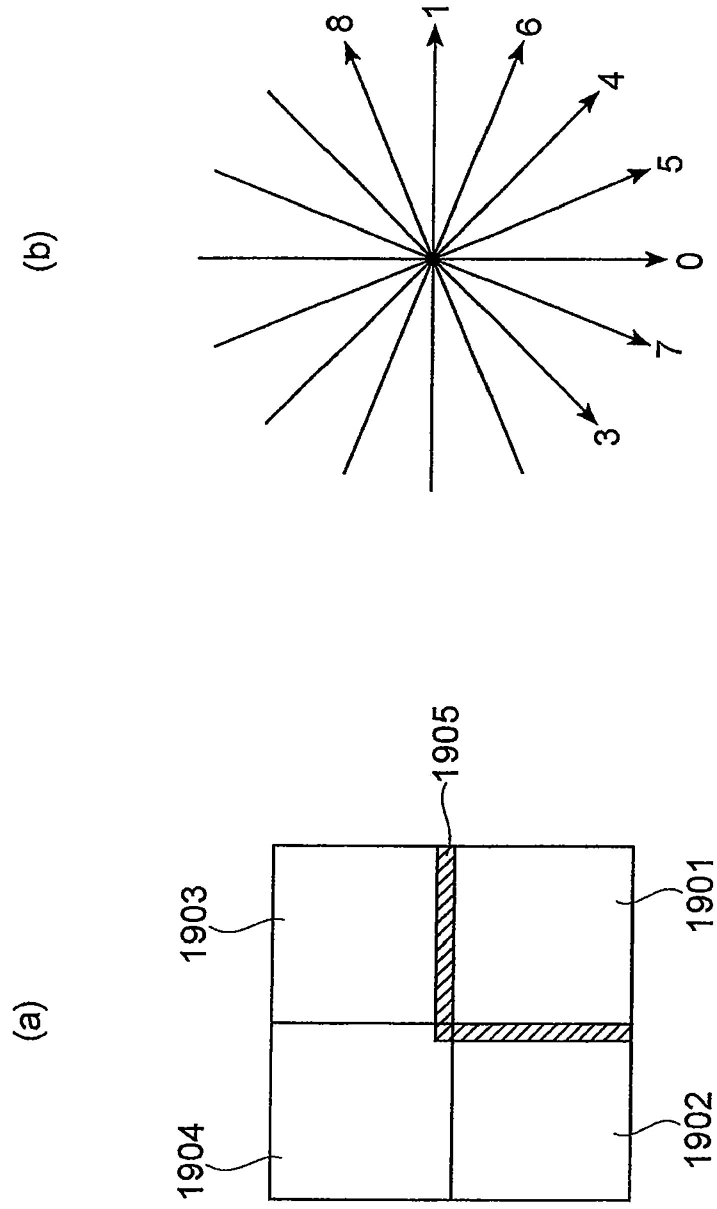
FIG. 39 (*a*) is a schematic diagram for explaining the intra-frame prediction method used in H.264 and FIG. 39 (*b*) is a drawing showing extending directions of pixel signals in the intra-frame prediction method of H.264.
Figure 40:
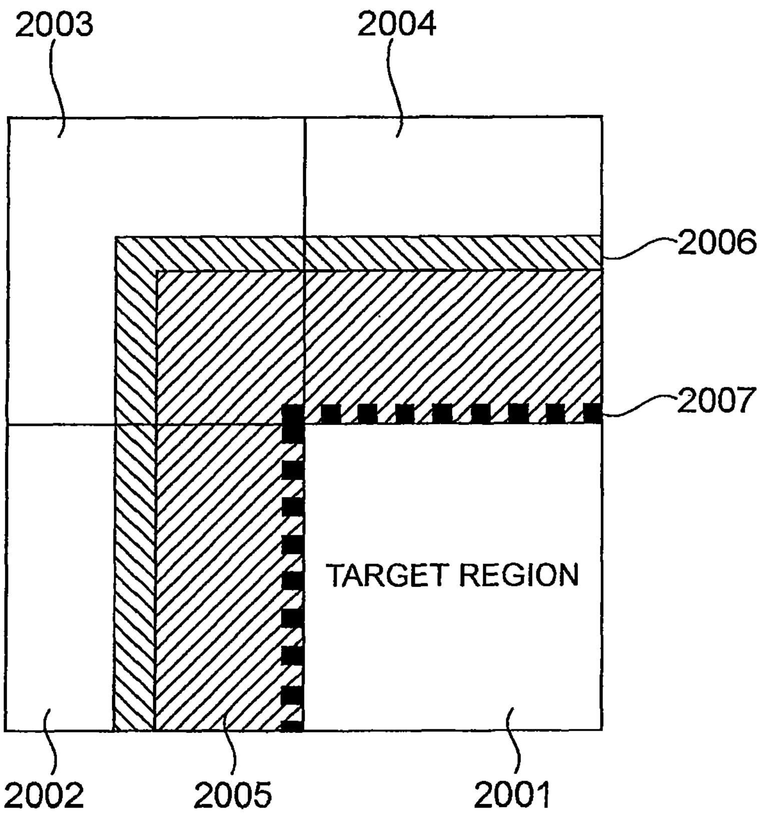
FIG. 40 is a schematic diagram for explaining a conventional process of generating the reference mode information.

For example, the adjacent mode determining unit uses the first prediction methods as shown in FIGS. 30 to 38, corresponding to the second prediction methods (FIGS. 4 to 12). More specifically, as shown in FIG. 30, a pixel group G3004 of pixels a-p is pixels included in a target block, a pixel group 3003 of pixels A-M is a proximate pixel group, and a pixel group G3005 of pixels a'-x' is pixels included in an adjacent region adjacent to the target block with the proximate pixel group in between. The adjacent mode determining unit generates the prediction signal by upwardly extending each pixel, using the pixels A-D, and M in the proximate pixel group G3003, for the pixel group G3005 in the adjacent region. For pixels k'-x', the prediction signals of pixels k'-x' are generated using the pixel L in the proximate pixel group G3003. Specific operation expressions to be used in this case are Formulas (19) below, but, instead of Formulas (19) below, it is also possible to use original pixel values $o_o'$, $v_o'$ of the pixels o', v' included in the adjacent region G3005 as indicated by Formulas (20) below, or to use pixels X, Y outside the adjacent region G3005 not immediately adjacent to the target region as indicated by Formulas (21) below.

$$\mathrm{pred}(a',f')=M$$

$$\mathrm{pred}(b',g')=A$$

$$\mathrm{pred}(c',h')=B$$

$$\mathrm{pred}(d',i')=C$$

$$\mathrm{pred}(e',j')=D$$

$$\mathrm{pred}(k',l',m',n',o',p',q')=L$$

$$\mathrm{pred}(r',s',t',u',v',w',x')=L \qquad (19)$$

$$\mathrm{pred}(k',l',m',n',o',p',q')=o_o'$$

$$\mathrm{pred}(r',s',t',u',v',w',x')=v_o' \qquad (20)$$

$$\mathrm{pred}(k',l',m',n',o',p',q')=Y$$

$$\mathrm{pred}(r',s',t',u',v',w',x')=X \qquad (21)$$

Similarly, the adjacent mode determining unit extends the pixels in predetermined directions, using a part of the proximate pixel group G3103-G3803, for the adjacent region G3105-3805, as shown in FIGS. 31 to 38, to generate the prediction signals by Formulas (22) to (29) below, and determines the adjacent region prediction method, based thereon. The adjacent regions G3105-3805 all have the same shape and the same relative position from the target region. In the formulas, the character of subscript o represents a previously-reproduced pixel value.

$$pred(k',r')=L$$
$$pred(s',l')=K$$
$$pred(t',m')=J$$
$$pred(u',n')=I$$
$$pred(v',o')=M$$
$$pred(w',p',a',b',c',d',e')=E$$
$$pred(x',q',f',g',h',i',j')=E \quad (22)$$

$$pred(a',\ldots,x')=[A+B+C+D+I+J+K+L+4]/8 \quad (23)$$

$$pred(e')=(B+2C+D+2)/4$$
$$pred(d',j')=(A+2B+C+2)/4$$
$$pred(c',i')=(M+2A+B+2)/4$$
$$pred(b',h')=(3M+A+2)/4$$
$$pred(x')=(A'+2B'+C'+2)/4$$
$$pred(w',q')=(B'+2C'+D'+2)/4$$
$$pred(v',p',f')=(C'+2D'+E'+2)/4$$
$$pred(u',o',a',g')=(D'+2E'+F'+2)/4$$
$$pred(t',n')=(3M+I+2)/4$$
$$pred(s',m')=(M+21+J+2)/4$$
$$pred(r',l')=(I+2J+K+2)/4$$
$$pred(k')=(J+2K+L+2)/4 \quad (24)$$

$$pred(r',s',k')=L$$
$$pred(l',t')=(3L+K+2)/4$$
$$pred(m',u')=(J+2K+L+2)/4$$
$$pred(n',v')=(I+2J+K+2)/4$$
$$pred(o',w')=(M+21+J+2)/4$$
$$pred(p',x')=M$$
$$pred(a',q')=(M+2A+B+2)/4$$
$$pred(b',f')=(A+2B+C+2)/4$$
$$pred(c',g')=(B+2C+D+2)/4$$
$$pred(d',h')=(C+2D+E+2)/4$$
$$pred(e',i')=(D+2E+F+2)/4$$
$$pred(j)=(E+2F+G+2)/4 \quad (25)$$

$$pred(r')=(D'+2E'+F'+2)/4$$
$$pred(s')=(C'+2D'+E'+2)/4$$
$$pred(t',k')=(B'+2C'+D'+2)/4$$
$$pred(u',l')=(A'+2B'+C'+2)/4$$
$$pred(m',v')=(K+3L+2)/4$$
$$pred(n',w')=(J+2K+L+2)/4$$
$$pred(o',x')=(I+2J+K+2)/4$$
$$pred(p')=(M+21+J+2)/4$$
$$pred(q')=(I+2M+A+2)/4$$
$$pred(a')=(M+A+1)/2$$
$$pred(f')=(M+2A+B+2)/4$$
$$pred(b')=(A+B+1)/2$$
$$pred(g')=(A+2B+C+2)/4$$
$$pred(c')=(B+C+1)/2$$
$$pred(h')=(B+2C+D+2)/4$$
$$pred(d')=(C+D+1)/2$$
$$pred(i')=(C+2D+E+2)/4$$
$$pred(e')=(D+E+1)/2$$
$$pred(j')=(D+2E+F+2)/4 \quad (26)$$

$$pred(r')=(F'+G'+1)/2$$
$$pred(k')=(E'+2F'+G'+2)/4$$
$$pred(s')=(K+3L+2)/4$$
$$pred(l')=(K+L+1)/2$$
$$pred(t')=(J+2K+L+2)/4$$
$$pred(m')=(J+K+1)/2$$
$$pred(u')=(I+2J+K+2)/4$$
$$pred(n')=(I+J+1)/2$$
$$pred(v')=(M+2I+J+2)/4$$
$$pred(o')=(M+I+1)/2$$
$$pred(w')=(I+2M+A+2)/4$$
$$pred(p')=(M+2A+B+2)/4$$
$$pred(a',x')=(A+2B+C+2)/4$$
$$pred(b',q')=(B+2C+D+2)/4$$
$$pred(c',f')=(C+2D+E+2)/4$$
$$pred(d',g')=(D+2E+F+2)/4$$
$$pred(e',h')=(E+2F+G+2)/4$$
$$pred(i')=(F+2G+H+2)/4$$
$$pred(j')=(G+3H+2)/4 \quad (27)$$

$$pred(k')=(I+2J+K+2)/4$$
$$pred(l')=(M+2I+J+2)/4$$
$$pred(m',r')=(a_o'+2M+I+2)/4$$

$$pred(n',s')=(f_o'+2a_o'+M+2)/4$$

$$pred(a')=(J'+2K'+L'+2)/4$$

$$pred(f',o',t')=(J'+K'+1)/2$$

$$pred(p',u')=(I'+2J'+K'+2)/4$$

$$pred(q',v')=(I'+J'+1)/2$$

$$pred(w')=(H'+21'+J'+2)/4$$

$$pred(x')=(H'+I'+1)/2$$

$$pred(g')=(o_o'+2M+A+2)/4$$

$$pred(b')=(M+A+1)/2$$

$$pred(h')=(M+2A+B+2)/4$$

$$pred(c')=(A+2B+1)/2$$

$$pred(i')=(A+2B+C+2)/4$$

$$pred(d')=(B+C+1)/2$$

$$pred(j')=(B+2C+D+2)/4$$

$$pred(e')=(C+D+1)/2 \qquad (28)$$

$$pred(k')=(K+L+1)/2$$

$$pred(r')=(J+2K+L+2)/4$$

$$pred(l')=(J+K+1)/2$$

$$pred(s')=(I+2J+K+2)/4$$

$$pred(m')=(I+J+1)/2$$

$$pred(t')=(M+2I+J+2)/4$$

$$pred(n')=(M+I+1)/2$$

$$pred(u')=(a_o'+2M+I+2)/4$$

$$pred(o')=(a_o'+M+1)/2$$

$$pred(v')=(f_o'+2a_o'+M+2)/4$$

$$pred(b',i')=(M'+2N'+0'+2)/4$$

$$pred(a',h')=(L'+2M'+N'+2)/4$$

$$pred(p',g')=(K'+2L'+M'+2)/4$$

$$pred(w',f')=(J'+2K'+L+2)/4$$

$$pred(q')=(I'+2J'+K'+2)/4$$

$$pred(x')=(H'+21'+J'+2)/4$$

$$pred(c',j')=(o_o'+2M+A+2)/4$$

$$pred(d')=(M+2A+B+2)/4$$

$$pred(e')=(A+2B+C+2)/4 \qquad (29)$$

In cases where the prediction signal cannot be generated using the proximate pixel group only, the prediction signal may be generated using pixels included in the adjacent region, as in Formulas (28) and (29). Formulas (30) below may be used instead of Formulas (22), to generate the prediction signal using the pixels included in the adjacent region.

The prediction signal may also be generated using previously-reproduced pixels not immediately adjacent to the target region outside the adjacent region, as in Formulas (24), (26), (27), (28), and (29). Formulas (31) below may be used instead of Formulas (22), to generate the prediction signal using the previously-reproduced pixels. Furthermore, Formula (32) below may be used instead of Formula (23), to generate the prediction signal.

$$pred(w',p',a',b',c',d',e')=a_o'$$

$$pred(x',q',f',g',h',i',j')=f_o' \qquad (30)$$

$$pred(w',p',a',b',c',d',e')=X$$

$$pred(x',q',f',g',h',j')=Y \qquad (31)$$

$$pred(a', \ldots, x')=[A+B+C+D+I+J+K+L+M]/9 \qquad (32)$$

Industrial Applicability

The present invention is applicable to the image prediction encoding device, image prediction decoding device, image prediction encoding method, image prediction decoding method, image prediction encoding program, and image prediction decoding program and efficiently depresses the mode information for identification of the prediction method even if there are a lot of prediction methods provided as to the methods of generation of the intra-frame prediction signals in the pixel domain.

The invention claimed is:

1. An image prediction encoding device comprising:

a processor;

region dividing means executed by the processor to divide an input image into a plurality of regions;

prediction signal generating means executed by the processor to generate an intra-frame prediction signal for target pixel signals included in a target region, the target region being a processing object out of the plurality of regions;

residual signal generating means executed by the processor to generate a residual signal between the intra-frame prediction signal and the target pixel signals; and encoding means executed by the processor to encode the residual signal, wherein the prediction signal generating means includes a first prediction method determining unit executable by the processor to generate a plurality of prediction signals using a plurality of respective predetermined first prediction methods, the first prediction method determining unit further executable by the processor to identify one of the plurality of respective predetermined first prediction methods as an adjacent region prediction method having a prediction signal of highest correlation with pixel signals of an adjacent region that is adjacent to the target region, the adjacent region prediction method being derived using at least a part of a proximate pixel group, the proximate pixel group being previously-reproduced pixel signals immediately adjacent to the target region, and wherein the prediction signal generating means is further executable with the processor to predict a target region prediction method for the target pixel signals using said at least a part of said proximate pixel signals used to derive the adjacent region prediction method, the target region prediction method predicted according to the adjacent region prediction method derived by the first prediction method determining unit, and the prediction signal generating means is further executable with the processor to generate the intra-frame prediction signal for the target region based on the target region prediction method.

2. The image prediction encoding device according to claim 1, wherein the prediction signal generating means derives as the target region prediction method a prediction method having a predetermined relation with the adjacent region prediction method derived by the first prediction method determining unit.

3. The image prediction encoding device according to claim 2, wherein the predetermined relation is a relation in which directions of interpolation of pixel signals in the adjacent region and the target region are opposite to each other.

4. The image prediction encoding device according to claim 1, wherein the prediction signal generating means further includes a second prediction method determining unit which is executable by the processor to derive a target region prediction method for generation of the intra-frame prediction signal to have highest correlation with the pixel signals of the target region, the target region prediction method derived out of a plurality of predetermined second prediction methods using the at least a part of the proximate pixel group, and wherein the prediction signal generating means generates the intra-frame prediction signal for the target region according to the target region prediction method derived by the second prediction method determining unit, and the prediction signal generating means is further executed by the processor to generate relative information specifying both the target region prediction method and the adjacent region prediction method.

5. The image prediction encoding device according to claim 4, wherein the plurality of predetermined first prediction methods and the plurality of predetermined second prediction methods have a relation in which directions of interpolation of pixel signals in the adjacent region and the target region are opposite to each other.

6. The image prediction encoding device according to claim 1, wherein the first prediction method determining unit generates intra-frame prediction signals by the plurality of predetermined first prediction methods for an identical area of the adjacent region.

7. The image prediction encoding device according to claim 1, wherein the prediction signal generating means further includes a second prediction method determining unit which is executable by the processor to derive a target region prediction method for generation of the intra-frame prediction signal to have highest correlation with the pixel signals of the target region, the target region prediction method derived out of a plurality of predetermined second prediction methods using the at least a part of the proximate pixel group.

8. An image prediction decoding device comprising:

a processor;

data analyzing means executed by the processor to extract encoded data of a residual about a target region, the encoded data extracted as a processing object from compressed data;

residual signal restoring means executed by the processor to restore a reproduced residual signal from the extracted encoded data;

prediction signal generating means executed by the processor to generate an intra-frame prediction signal for target pixel signals included in the target region; and image restoring means executed by the processor to add the restored reproduced residual signal, to the intra-frame prediction signal to restore the target pixel signals included in the target region, wherein the prediction signal generating means includes a first prediction method determining unit which is executed by the processor to generate a plurality of predictions signals using a plurality of respective predetermined first prediction methods, the first prediction method determining unit further executable by the processor to identify one of the plurality of respective predetermined first prediction methods as an adjacent region prediction method having a prediction signal of highest correlation with pixel signals of an adjacent region adjacent to the target region, the adjacent region prediction method derived using at least a part of a proximate pixel group of previously-reproduced pixel signals immediately adjacent to the target region, and wherein the prediction signal generating means is executed to predict a target region prediction method for the target pixel signals using said at least a part of said proximate pixel group of previously-reproduced pixel signals immediately adjacent to the target region, the target region prediction method being predicted according to the adjacent region prediction method derived by the first prediction method determining unit, and wherein the prediction signal generating means is further executed to generate the intra-frame prediction signal for the target region based on the target region prediction method.

9. The image prediction decoding device according to claim 8, wherein the prediction signal generating means derives as the target region prediction method a prediction method having a predetermined relation with the adjacent region prediction method derived by the first prediction method determining unit.

10. The image prediction decoding device according to claim 9, wherein the predetermined relation is a relation in which directions of interpolation of pixel signals in the adjacent region and the target region are opposite to each other.

11. The image prediction decoding device according to claim 8, wherein the data analyzing means is further executable to extract from the compressed data relative prediction method information for identification of the target region prediction method, and wherein the prediction signal generating means is executed to predict the target region prediction method according to the adjacent region prediction method derived by the first prediction method determining unit to restore the target region prediction method from the adjacent region prediction method and the relative prediction method information, and the prediction signal generating means is executed to generate the intra-frame prediction signal using the proximate pixel group based on the target region prediction method.

12. The image prediction decoding device according to claim 8, wherein the first prediction method determining unit generates intra-frame prediction signals by the plurality of predetermined first prediction methods for an identical area of the adjacent region.

13. The image prediction decoding device according to claim 8, wherein the first prediction method determining unit is executed to predict the target region prediction method based on only the adjacent region prediction method in response to absence of information about the intra-frame prediction method being included in the compressed data.

14. An image prediction encoding method comprising:

a region dividing step in which region dividing means divides an input image into a plurality of regions;

a prediction signal generating step in which prediction signal generating means generates an intra-frame prediction signal for target pixel signals included in a target region, the target region being a processing object out of the plurality of regions;

a residual signal generating step in which residual signal generating means generates a residual signal between the intra-frame prediction signal generated by the prediction signal generating means, and the target pixel signals; and an encoding step in which encoding means encodes the residual signal generated by the residual signal generating means, wherein the prediction signal generating step includes a first prediction method determining step in which the prediction signal generating means generates a plurality of respective predetermined first prediction methods and identifies one of the plurality of respective predetermined first predictions methods as an adjacent region prediction method having a prediction signal of highest correlation with pixel signals of an adjacent region adjacent to the target region, the adjacent region prediction method using at least a part of a proximate pixel group of previously-reproduced pixel signals immediately adjacent to the target region, and wherein the prediction signal generating means predicts a target region prediction method for the target pixel signals using said at least a part of said proximate pixel group of previously-reproduced pixel signals immediately adjacent to the target region, the target region prediction method predicted according to the adjacent region prediction method derived by the first prediction method determining step, and wherein the prediction signal generating means generates the intra-frame prediction signal for the target region based on the target region prediction method.

15. An image prediction decoding method comprising:

a data analyzing step in which data analyzing means extracts encoded data of a residual about a target region as a processing object from compressed data;

a residual signal restoring step in which residual signal restoring means restores a reproduced residual signal from the encoded data extracted by the data analyzing means;

a prediction signal generating step in which prediction signal generating means generates an intra-frame prediction signal for target pixel signals included in the target region; and an image restoring step in which image restoring means adds the reproduced residual signal restored by the residual signal restoring means, to the intra-frame prediction signal generated by the prediction signal generating means, thereby to restore the target pixel signals included in the target region, wherein the prediction signal generating step includes a first prediction method determining step in which the prediction signal generating means generates a plurality of prediction signals using a plurality of respective predetermined first prediction methods and identifies one of the plurality of respective predetermined first prediction methods as an adjacent region prediction method having a prediction signal of highest correlation with pixel signals of an adjacent region adjacent to the target region, the adjacent region prediction method derived using at least a part of a proximate pixel group of previously-reproduced pixel signals immediately adjacent to the target region, and wherein the prediction signal generating means predicts a target region prediction method for the target pixel signals using said at least a part of said proximate pixel group used to derive the adjacent region prediction method, the target region prediction method being predicted according to the adjacent region prediction method derived by the first prediction method determining step, and wherein the prediction signal generating means generates the intra-frame prediction signal for the target region based on the target region prediction method.

16. A non-transitory computer readable storage medium configured to store instructions executable by a processor, the computer readable storage medium comprising:

instructions executable by the processor to divide an input image into a plurality of regions;

instructions executable by the processor to generate an intra-frame prediction signal for target pixel signals included in a target region, the target region being a processing object out of the plurality of regions;

instructions executable by the processor to generate a residual signal between the intra-frame prediction signal, and the target pixel signals; and instructions executable by the processor to encode the residual signal, wherein the instructions executable to generate the intra-frame prediction signal include instructions executable by the processor to generate a plurality of prediction signals using a plurality of respective predetermined first prediction methods and identify one of the plurality of respective predetermined first prediction methods as an adjacent region prediction method having a prediction signal of highest correlation with pixel signals of an adjacent region adjacent to the target region, the intra-frame prediction signal being generated using at least a part of a proximate pixel group, the proximate pixel group being previously-reproduced pixel signals immediately adjacent to the target region, and wherein the instructions executable to generate the intra-frame prediction signal further include instructions executable by the processor to predict a target region prediction method for the target pixel signals according to the adjacent region prediction method, and instructions executable by the processor to generate the intra-frame prediction signal for the target region based on the target region prediction method.

17. The computer readable storage medium of claim 16, wherein the instructions executable by the processor to predict the target region prediction method for the target pixel signals further include instructions executable by the processor to predict the target region prediction method for the target pixel signals using said at least a part of said proximate pixel group, the proximate pixel group being the previously-reproduced pixel signals immediately adjacent to the target region.

18. The computer readable storage medium of claim 17, wherein the instructions executable by the processor to derive an adjacent region prediction method and the instructions executable by the processor to predict a target region prediction method are different methods executed sequentially by the processor to generate the intra-frame prediction signal for the target region.

19. A non-transitory computer readable storage medium configured to store instructions executable by a processor, the computer readable storage medium comprising:

instructions executable by the processor to extract encoded data of a residual about a target region, the encoded data being extracted as a processing object from compressed data;

instructions executable by the processor to restore a reproduced residual signal from the extracted encoded data;

instructions executable by the processor to generate an intra-frame prediction signal for target pixel signals included in the target region; and instructions executable by the processor to add the reproduced residual signal to the intra-frame prediction signal to restore the target pixel signals included in the target region, wherein the instructions executable to generate the intra-frame prediction signal include instructions executable by the processor to generate a plurality of prediction signals using a plurality of respective predetermined first prediction methods, and identify one of the plurality of respective predetermined first prediction methods as an adjacent region prediction method having a prediction signal of highest correlation with pixel signals of an adjacent region adjacent to the target region, the adjacent region prediction method being derived using at least a part of a proximate pixel group, the proximate pixel group being previously-reproduced pixel signals immediately adjacent to the target region, and wherein the instructions executable to generate the intra-frame prediction signal include instructions executable by the processor to predict a target region prediction method for the target pixel signals using said at least a part of said proximate pixel group also used to derive the adjacent region prediction method, the target region prediction method being predicted according to the adjacent region prediction method, and instructions executable by the processor to generate the intra-frame prediction signal for the target region based on the target region prediction method.

20. The image prediction encoding device according to claim 1, wherein the adjacent region prediction method and the target region prediction method are different methods executed sequentially by the processor to generate the intra-frame prediction signal for the target region.

* * * * *